3,829,505
POLYETHERS AND METHOD FOR
MAKING THE SAME
Robert Johnston Herold, Akron, Ohio, assignor to The
General Tire & Rubber Company
No Drawing. Continuation of application Ser. No. 13,773,
Feb. 24, 1970, which is a continuation-in-part of application Ser. No. 479,333, Aug. 12, 1965, both now abandoned. This application July 7, 1972, Ser. No. 269,631
Int. Cl. C07c 41/00
U.S. Cl. 260—611 B     6 Claims

ABSTRACT OF THE DISCLOSURE

Hydroxy terminated polyethers are obtained by reacting (1) epoxide and oxetane monomers with (2) a telogen at least partially soluble with the monomers, reactive with said monomers and being selected from the group consisting of organic hydroxy containing compounds, sulfhydryl containing compounds, aldehydes and ketones, such as methanol, hexanedione-2,5, acetone, ethylene glycol, trimethylol propane, etc., using (3) in admixture therewith as catalysts certain double metal cyanide complexes which preferably had been treated with organic materials like alcohols, ethers, esters and so forth. A feature of the process of the present invention is the preparation of high molecular weight diols, triols, etc. without appreciable end group unsaturation, and the use of certain solvents with particular monomers and catalysts to also achieve these results.

The products of the present process are useful as nonionic surface active agents, as lubricants and coolants, as textile sizes, as films for packaging and in the preparation of solid or flexible polyurethanes by reaction with polyisocyanates.

---

This application is a continuation of prior copending application Ser. No. 13,773, filed Feb. 24, 1970 (now abandoned), which in turn is a continuation-in-part of prior copending application Ser. No. 479,333, filed Aug. 12, 1965 (now abandoned).

The present invention relates to a method for making hydroxy terminated polyethers or polyether telomers and more particularly to a method of making polyethers having more than one active hydroxyl group, and to the products of such methods.

It is an object of the present invention to provide a method for making hydroxy terminated polyethers.

It is another object of this invention to provide a method for making relatively low molecular weight liquid polyethers having a hydroxyl functionality greater than one such as polyalkylene ether glycols, triols and so forth.

A further object is to provide hydroxy terminated polyethers which can be liquid.

These and other objects and advantages of the present invention will become more apparent to those skilled in the art from the following detailed description and examples.

According to the present invention it has been discovered that hydroxy terminated polyethers can be obtained by reacting (1) epoxide and oxetane monomers with (2) a telogen at least partially soluble with the monomers, reactive with said monomers and being selected from the group consisting of organic hydroxy containing compounds, sulfhydryl containing compounds, aldehydes and ketones, using (3) in admixture therewith as catalysts certain double metal cyanide complexes which have been treated with organic materials like alcohols, ethers, esters and so forth. Depending on the amount of telogen used the resulting polymers referred to hereafter as telomers can vary from light oils to greases and solids having at least a hydroxyl functionality of one. If di and higher functionality telogens are used, the resulting telomers have a hydroxyl functionality approaching the functionality of the telogen. Additionally, it has been found that while certain catalysts containing acidic metal halide, e.g., Cl and Br, residues give narrower molecular weight distributions, they also give polymers with undesirable unsaturation (loss of OH functionality) particularly when certain epoxide monomers are used which are prone to isomerize to the corresponding allylic alcohol but that this unsaturation may be suppressed by telomerization in certain basic solvents.

A feature of the process of the present invention is the preparation of high molecular weight diols, triols, etc. without appreciable end group unsaturation. For example, the catalyst presently used in making polyetherpolyols is KOH. However, the molecular weight of products made with KOH appear to be limited to about 4000. While the diols produced with KOH and by the method of this invention are of about the same functionality, i.e., hydroxyl groups per molecule, at 1000 molecular weight, at 2000 molecular weight and higher the diols produced with KOH have significantly lower OH functionality than those produced by the present invention. Similar differences in functionality may be seen in the case of triols at the 3000 and 4000 molecular weight levels. Using KOH as a catalyst, the reaction of glycol and 1,2-epoxy butane does not provide high molecular weight polymers.

TELOGEN AND TELOMER

It is not precisely known what happens in the present process although it is believed that the telogen acts as a chain transfer agent. The telogen is not believed to affect propagation but rather to institute chain transfer to produce polymers having rather a low average molecular weight and a narrow molecular weight distribution in certain instances. The alcohols, glycols, etc. react through their hydroxyl group(s) and the mercaptans through their sulfhydryl group(s). It is believed that the basic reaction responsible for this effect is transfer of a proton from a hydroxyl group of an alcohol, for example, to a growing polymer chain with simultaneous transfer of the catalyst from that growing chain to the oxygen of the hydroxyl:

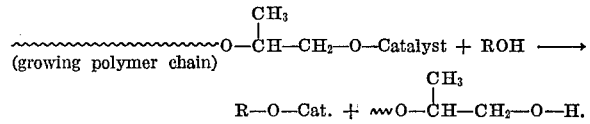

$$\text{(growing polymer chain)} \sim\sim\sim\text{O}-\overset{\overset{\displaystyle CH_3}{|}}{\text{C}}\text{H}-\text{CH}_2-\text{O}-\text{Catalyst} + \text{ROH} \longrightarrow$$

$$\text{R}-\text{O}-\text{Cat.} + \sim\sim\text{O}-\overset{\overset{\displaystyle CH_3}{|}}{\text{C}}\text{H}-\text{CH}_2-\text{O}-\text{H}.$$

The ketones and aldehydes most probably first enolize and then follow the above sequence. The efficiency of this reaction is emphasized by the fact that as many as 500 telomer chains per catalyst unit may be formed. The telogens should preferably be liquids as such or under the telomerization conditions of temperature and pressure. However, solid telogens are useful. They, also, should be soluble in or at least partially soluble in the epoxide or oxetane monomer. The extent of solubility should be at least a tenth of a percent by weight of the epoxide etc. The remaining material goes into solution as it is reacted. These telogens should also be free of primary and/or secondary aliphatic amino groups.

Telogens which can be used in the practice of the method of the present invention are organic hydroxy containing compounds such as primary, secondary and/or tertiary alcohols; diols and polyols; and other hydroxy containing compounds such as the phenols. The corresponding organic sulfhydryl containing compounds, such as mercaptans or thiols, polythiols and the like can be used. Aldehydes and ketones including dialdehydes and diketones can also be used; however, it is preferred that the diketone should be one which does not form a conjugated double bond in the enol form. The telogens, also, may contain 1,2-epoxide or 3-oxetane groups, halogen atoms and/or olefinic (carbon-to-carbon double bond) unsaturation. They can be aliphatic, aromatic or alicyclic monomeric or polymeric compounds. The average molecular weight of the telogen can vary from about 31 to 300,000 or even higher. However, it is preferred that the average molecular weight be from about 31 to 4000.

Examples of telogens which can be employed are methyl alcohol, ethyl alcohol, propyl alcohol, octyl alcohol, cetyl alcohol, ceryl alcohol, isopropyl alcohol, 2-methyl-2-propanol, benzyl alcohol, cyclohexanol; glycol, diethylene glycol, triethylene glycol, pinacol, polypropylene ether glycol (av. M.W. 3000), polyethylene-propylene ether glycol (av. M.W. 1500), polytetramethylene ether glycol (av. M.W. 2500), polyester glycols (adipic acid and ethylene glycol, av. M.W. 3000), propanediol-1,3, butanediols, pentanediol-1,5; trimethylol propane, tripropylene oxide adduct of glycerol, trimethylol propane monoallyl ether, pentaerythritol, mannitol, and the sugars such as the mono- and poly-saccharides, i.e., glucose, fructose, sucrose, raffinose and so forth as well as the polyfunctional polyether polyols made by reacting a minor molar amount of hexane triol or glycerine with propylene oxide or ethylene oxide or other alkylene oxide and the polyfunctional polyester polyols made by reacting a minor molar amount of an aliphatic dicarboxylic acid with an excess of glycol and a small amount of glycerine, hexanetriol, etc. and the like. Phenols which can be employed are phenol, p-monochloro phenol, p-cresol, thymol, xylenol, hydroquinone, resorcinol, resorcinol bottoms, phloroglucinol, o-, m-, or p-hydroxy styrene, saligenin, bisphenol A, bisphenol F, 4,4'-dihydroxy diphenyl, 4,4'-dihydroxy diphenyl sulfone, 4,6,4'-trihydroxy diphenyl dimethyl methane, long chain bisphenols having the general formula

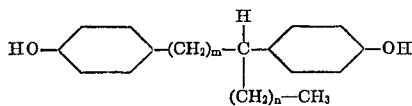

where $n$ and $m$ are numbers from 1 to 4, novolac resins having a plurality of OH groups and having the formula

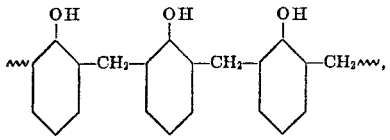

and so forth. These diols, triols, polyols and other active OH containing materials, preferably linear or only slightly branched, can be reacted with minor molar amounts of polyisocyanates such as tolylene diisocyanate, naphthalene diisocyanate, triphenyl methane-4,4',4''-triisocyanate, etc., to make OH containing or terminated polyurethane polyols. In place of the polyisocyanates, polyisothiocyanates can be used.

Aldehydes which can be used include propionaldehyde, butyraldehyde, valeraldehyde, acrolein, methyl acrolein, succinaldehyde, benzaldehyde, tolualdehyde, aldol, and so forth. Ketones which can be use are acetone, 3-pentanone, 3-hexanone, 3-heptanone, methylethyl ketone, hexanedione-2,5, cyclopentanone, cyclobutanone, acetophenone, and so forth. Other useful telogens are glycidol, 1,2-epoxy butanol-4, 1,2-epoxy pentanol-5, and so forth. The epoxy alcohols are considered to be monomeric telogens since they can be incorporated in some of the initial chain sequences to give a chain transfer site and a telomerized group. Also, dihydroxy conjugated diene polymers can be used. To prepare these polymers an organic dihalide is reacted with an alkali metal to form an initiator such as M—R—M, where M is the alkali metal and R is butane, pentane, butene, isobutene, etc., of 4 to 20 carbon atoms. The initiator is then reacted with a conjugated diene of 4 to 6 carbon atoms for example, butadiene, to form a polymer M—(BDN)$_x$—R—(BDN)$_y$—M, $x$ and $y$ being numbers such that the resulting polymer has an average molecular weight as indicated above. The polymer is next treated in solvent with oxygen to form MO—(BDN)$_x$—R—(BDN)$_y$—OM which is treated with $H_2SO_4$ or HCl acid to convert the MO— groups to HO— groups. If desired, these unsaturated polymers can be hydrogenated to remove all or essentially all of the aliphatic double bonds.

Still other telogens can be used such as polyvinyl alcohol, or partially or essentially entirely hydrolyzed polyvinyl acetate, vinyl acetate-butadiene copolymers, vinyl acetate-styrene copolymers, vinyl acetate-acrylonitrile or methacrylonitrile copolymers, vinyl acetate-vinyl chloride copolymers, vinyl acetate-vinylidene chloride copolymers, as well as copolymers of vinyl acetate and monomers such as dichlorostyrene, vinyl ethyl ether, ethylene, propylene, isobutylene, isoprene and the like.

Examples of mercaptans, thiols, etc. which can be used are 1-pentanethiol, 2-methyl-1-butanethiol, 3-methyl-1-butanethiol, thiophenol, o-, m-, and p-thiocresol, 1,2-ethanedithiol, ethanethiol, furfuryl mercaptan, 1-hexanethiol, thio-1-naphthol, 2-propanethiol, dithioresorcinol, thioglycerol, propanetrithiol, 1,4-benzenedithiol, monothiohydroquinone, thiodiglycol, and thiomonoglycol and the like. The "Thiokol" polymers can also be used and they are generally polysulfide polymers, which are preferably predominantly linear and liquid having terminal —SH groups and a plurality of intralinear polysulfide linkages connecting recurring alkylene or oxyalkylene units; some of them may be branched or cross-linked to some degree. Some of these materials have the general formula:

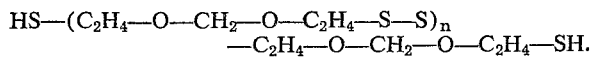

The "Thiokol" polymers as well as other polythiols, thioglycols, etc. may be reacted with minor molar amounts of organic polyisocyanates such as tolylene diisocyanate, hexamethylene diisocyanate, triphenyl methane-4,4',4''-triisocyanate and the like to form —SH terminated polythiourethanes which also can be used. In place of the polyisocyanates, the corresponding organic polyisothiocyanates such as xylylene-α,α'-diisothiocyanate, etc. can be used for such purposes. Mixtures of the various telogens can be used.

Preferred compounds to make high functionality polyethers are the aliphatic polyols having from 2 to 6 —OH groups and average molecular weights up to 4000 such as ethylene glycol, 1,5-pentane diol, diethylene glycol, trimethylol propane, 1,2,6-hexane triol, pentaerythritol, the propylene oxide adduct of glycerine (having a molecular weight of about 260), hexose, polyalkylene ether glycols, triols, tetrols, pentols and hexols, and so forth and mixtures thereof.

The amount of monomer to be used with relation to the telogen will depend on the ultimate purpose to be achieved. However, in general, the ratio of the mols of the epoxide or monomer to the functionality (hydroxy, sulfhydryl, ketone or aldehyde oxygen) of the telogen will vary from about 3500:1 to 1:100. It can be said that there should be at least 1 mol of monomer per mol telogen and at least sufficient monomer should be used to provide a plurality of new ether linkages. It will be appreciated that where a relatively high molecular weight (150,000) polyalkylene ether alcohol is desired, the mol ratio of the epoxide or oxetane monomer such as ethylene oxide to a low molecular weight telogen such as methanol having only one hydroxyl function will be rather high, for example, about 3400 to 1. In making a 5000 M.W. polymer from propylene oxide and 1,2,3-tri(2-hydroxy propoxy) propane the mol ratio of epoxide to telogen is 70:1 and the ratio of mols epoxide to hydroxy functionality of the telogen is about 23:1. On the other hand, starting with a partially or fully hydrolyzed 50:50 vinyl acetate-styrene copolymer where it is desired to alter its crystallinity, film forming characteristics, reduce its heat distortion value, and the like, it may only be necessary to react with a portion of the hydroxyl groups to get the desired results. In the latter case from a statistical standpoint, even if sufficient epoxides were used to theoretically react with all of the OH groups, it is likely that some will not be reacted while others will have more than one ether linkage. It can be said that in the type of polymerization system under consideration the epoxide or oxetane will continue to polymerize on the telogen as long as monomer is fed to the system and so long as any impurities in it do not stop polymerization or telomerization and/or so long as the catalyst is not deactivated. Where it is desired to modify only 5% of the OH groups of a polyvinyl alcohol (fully hydrolyzed polyvinyl acetate) having a M.W. of about 30,000 to impart modified heat distortion properties by adding ethylene oxide, the ratio of the hydroxyl functionality of the telogen to the mols of epoxide such as ethylene oxide is 20:1.

This method may also be used to modify high molecular weight polymers such as those shown above. Thus, when a solution of a hydroxyl containing high polymer, the polymerizable cyclic oxide monomer and the catalyst are brought together the cyclic oxide would add to the hydroxyl groups. This process is usually referred to as grafting when applied to high molecular weight polymers but may be seen to involve the same sequence of reactions herein described as telomerization when applied to small molecules.

The monomers can be telomerized with the catalyst and telogen in mass (bulk), or in solvent (which can facilitate handling and transfer of heat). They, also, can be telomerized under inert and/or non-oxidizing conditions, for example, under an atmosphere of nitrogen, argon, neon, helium, krypton or other inert atmosphere. Alternatively, the inert gas can be omitted and the monomer telomerized only under pressure from any vaporized solvent if used, vaporized monomer or telogen. In some instances the telomerization can be conducted in reactors containing or open to the air provided the air is free of materials which would inhibit telomerization (i.e., conversion or molecular weight) and especially free of $H_2O$, although this procedure can be hazardous for some of the monomers are flammable and some telomerization reactions go so fast as to be explosive. Both the monomer and telogen should be soluble in the solvent which should be an inert or non-reactive solvent. Examples of useful solvents are heptane, octane, cyclohexane, toluene, benzene, trimethylpentane, n-hexyl chloride, n-octyl chloride, carbon tetrachloride, chloroform, trichloroethylene, tetrahydrofuran, dioxane (m or p), methyl tetrahydrofuran, 2-ethyl tetrahydrofuran, ethylene glycol dimethyl ether, ethylene glycol diethyl ether, diethylene glycol diethyl ether, triethylene glycol dimethyl ether, diethylene glycol dimethyl ether, octaethylene glycol diethyl ether, tetrahydropyran, amyl ethyl ether, diphenyl ether, butyl ethyl ether, butyl phenyl ether, ethyl hexyl ether, isopropyl phenyl ether, 1,2,4,5-tetra ethyl benzene, xylene (o, m or p), 4-ethyl-o-xylene, 1-benzyl-4-ethyl benzene, t-butyl butane, t-butyl benzene, 1,2-diethyl benzene, 1-phenyl pentane, pentaethyl benzene, dibutyl sulfide, diethyl sulfide, diisoamyl sulfide, diisobutyl sulfide, diphenyl sulfide, di-n-propyl sulfide and so forth and mixtures of the same. Preferably, since it is believed that the catalyst tends to be acidic when containing acidic metal halide residues and can cause some terminal or internal unsaturation and loss of functionality, it is preferred to use basic solvents (those which can contribute electrons or which can be considered as electron donors) such as the organic hydrocarbon ethers (particularly the cyclic ethers and polyethers), sulfides, and the aromatic compounds containing at least one benzene ring disclosed herein which are non-reactive or non-polymerizable in the present system and which have from 4 to 20 carbon atoms in an amount sufficient, usually in an amount of from about 2 to 400 parts by weight, per 100 parts by weight of monomer(s), to reduce or prevent unsaturation and, where desired, to act as a heat transfer medium.

Since many of the reactants are volatile, the telomerization should be conducted in a closed container and may be under pressure. Pressure should be at least sufficient to maintain the liquid state for dispersion of catalyst and heat transfer although it is possible to bubble monomer into the solution. Telomerization can be conducted at temperatures of from about 0° C. to 180° C. although somewhat wider temperature ranges can be used. Preferably temperatures of from about 15° C. to 80° C. are used for telomerization. An induction period of about ¼ to 2 hours or more may be observed with some of the catalysts. It is very desirable to telomerize while agitating the monomer(s), catalyst, telogen and solvent.

The catalyst generally becomes very well dispersed if not completely dissolved (molecularly dispersed) in the polymerization solution. Thus, centrifugation even after dilution in a non-viscous solvent does not usually remove a major proportion of the catalyst. Chemical methods, however, have been found useful in removing major amounts of the catalyst. Ion exchange of the polymer in water-methanol solution has been shown to reduce the conductivity of the telomer many fold by reducing the catalyst or catalyst residue content. Passage through a bed of activated alumina either with or without a prior treatment with aqueous ammonia also reduces the catalyst residue in such polymers. The necessity of removal of the catalyst will depend on ultimate use of the polymer.

The propagation step of this reaction is exothermic. Some monomers may telomerize very rapidly in the presence of this catalyst. This may be controlled by the concentration of the catalyst, by use of a diluent, and by the proper choice of temperature. Since heat transfer during propagation and transfer may be critical in medium and large size batch reactors, loop type reactors can be used to reduce the induction period by temperature cycling in the loop, for the product is a liquid or semiliquid. Also, continuous telomerization systems may be used in which the telogen or monomer is fed into the system and polymer etc. withdrawn.

Gel formation during telomerization with unsaturated monomers is not usually observed using the double metal cyanide catalysts, and consequently gel inhibitors are not normally required. Antioxidants or antidegradants such as phenyl beta naphthylamine, PBNA, or other antidegradants are desirably added prior to or after polymerization to avoid degradation which might occur. PBNA may be used in an amount by weight approximately equal to the amount of the catalyst during telomerization. Some antidegradants may retard polymerization and should be added after telomerization.

In telomerizing according to the present invention, it is preferred to add the ingredients to the reactor in the following order: catalyst, monomer and telogen. However, for many purposes all three materials can be added at once.

Incremental addition of monomer and telogen can be used to vary the molecular weight distribution of the telomer product. When the monomer is added incrementally, the distribution of molecular weights becomes narrower, apparently as a result of the mass action law, i.e., when the concentration of the monomer is lower, the transfer reaction is comparatively favored. On the other hand; incremental addition of the telogen leads to a wider distribution of molecular weight for essentially the same reason as above, i.e., the concentration of the transfer agent is initially lower and thereby the propagation step is favored.

The solvent can be added separately or mixed with one or more of the ingredients. Preferably, it is added to the reactor first, or there is some solvent in the reactor prior to the addition of the other ingredients.

The polymers and copolymers (or the telomers and cotelomers) prepared according to the method of the present invention have average molecular weights of at least 300, preferably from about 300 to 150,000 or higher. They vary physically from light oils to tacky solids or semisolids, or even to solids. Some are one phase polymeric substances, others may contain two phases, one an oil and the other a crystalline polymer or high molecular weight insoluble polymer. Depending on the telogen used they will have an average of from one to four or more hydroxyl groups and a plurality of ether linkages. For example, where acetone is used as the telogen the resulting polymer has the general formula:

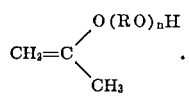

Treatment of the telomer by mild acid hydrolysis or with ion exchange resins removes the isopropenyl group and gives H—O(RO)$_n$H. If the telomer is a cotelomer of propylene oxide and allyl glycidyl ether, acid hydrolysis or ion exchange treatment will not affect the allyl double bonds. Monoalcohols will also give monofunctional polymers. Diols, polyols and higher functionality telogens will provide telomers of the same functionality as the telogen. The polymer generally grows at one end with the monofunctional telogen and at both ends of the di (or higher) functional telogens. Block cotelomers may be produced by adding various monomers alternately to increase rigidity and so forth. The use of some unsaturated monomers permits the resulting cotelomer to be vulcanized after extending with diisocyanate or other extending agent into the range of useful molecular weight for preparation of rubbers.

The telomers produced by the method of the present invention are useful in many ways. They are useful as nonionic surface active agents, as lubricants for metal to metal surfaces, as textile sizes or finishing agents, as coolants for internal combustion engines and as hydraulic brake fluids. They can be used to make protective coatings and films for packaging. Telomers having average hydroxyl functionalities of 2, 3 or more hydroxyl groups per molecule can be used in making flexible and rigid polyurethane foams (for pillows, mattresses, insulation for refrigerators) by reaction with polyisocyanates, in the presence of tertiary amines, tin or other catalyst, silicones and so forth. Such telomers can also be employed in making millable (gums) or castable polyurethanes for bushings, coatings (clothing), laminates (wall panels) etc. The liquid telomers of this invention having an average molecular weight up to about 5000 from propylene oxide or butene oxide etc. and a low molecular weight diol or triol are particularly useful in making polyether urethanes. When such millable gums contain unsaturation (carbon-to-carbon double bonds), they may be cured by conventional rubber curing procedures depending on the amount of unsaturation such as by using natural or butyl rubber curing systems. The telomers of this invention, also, can be used to make polyurethanes by reaction with phosgene and diamine. Moreover, these telomers can be reacted with mono and polycarboxylic acids to make high molecular weight polyesters. Telomers prepared from epoxide and oxetane modified high polymers such as those of hydrolyzed vinyl acetate polymers have changes in plasticity, heat temperature distortion values, etc.

The polymers (telomers and cotelomers) prepared by the method of the present invention as well as their extension products with isocyanates etc. may be compounded or mixed if desired with the usual rubber and plastic compounding materials such as curing agents, anti-degradants, fillers, extenders, ultraviolet light absorbers, fire resistant materials, dyes, pigments, plasticizers, lubricants, other rubbers, resins, plastics and the like.

MONOMER

The organic cyclic oxides to be telomerized or polymerized include any cyclic oxide (such as 1,2-epoxide, oxetane, 3-substituted oxetane or 3,3-disubstituted oxetane) having an oxygen-carbon ring in which an oxygen atom is joined to 2 or 3 carbon atoms in the ring which will open and telomerize with the same or other cyclic oxide monomers in the presence of the catalyst and having up to a total of 18 carbon atoms. These monomers, also, may contain 1, 2 or more, preferably only 1, aliphatic carbon-to-carbon double bonds. The alkenyl, ether and halogen (except easily ionizable halogen substituted derivatives) substituted derivatives of these cyclic oxides can likewise be employed. These cyclic oxides should be pure or essentially pure to obtain the best results.

Examples of useful cyclic oxides are ethylene oxide (1,2-epoxy ethane), 1,2-propylene oxide, 1,2-butene oxide (or 1,2-epoxy butene or 1,2-epoxy butane), 1,2-dodecane monoxide, isobutylene monoxide, styrene oxide, 1,2-pentene oxide, isopentene oxide, 1,2-diisobutylene oxide, 1,2-hexene oxide, 1,2-heptene oxide, allyl glycidyl ether, isoheptene oxide, 1,2-octene oxide, 1,2-nonene oxide, 1,2-decene oxide, 1,2-hendecene oxide, methyl glycidyl ether, ethyl glycidyl ether, phenyl glycidyl ether, butadiene monoxide, isoprene monoxide, oxetane ($C_3H_6O$), tolyl glycidyl ether, 3,3-dimethyl oxetane, 3-n-nonyl oxetane, 3-allyl-3-methyl oxetane, 3-vinyl-3-methyl oxetane, 1,2-pentadecene oxide, 3,3-diethyl oxetane, 3-ethyl-3-butyl oxetane, 3-chloromethylene oxetane, 3-chloromethyl-3-methyl oxetane, 3-methyl-3-ethyl oxetane, and other cyclic oxides. Of these materials, it is preferred to use the lower molecular weight cyclic oxides such as ethylene oxide, propylene oxide, butylene oxide, etc. containing from 2 to 12 carbon atoms. Mixtures of 2, 3, 4, 5 or more of the cyclic oxide monomers can be used for telomerization.

For use in making castings and the like one or more of the above cyclic oxides can be reacted with one or more cyclic oxides having 2, 3 or more rings of from 2 to 3 carbon atoms and 1 oxygen atom in amounts up to 20 mol percent of total monomers to provide cross-linking sites in the polymer. Examples of these cyclic oxides (i.e., di, tri, etc. epoxides and/or oxetanes) are: butadiene dioxide, limonene dioxide, bis(3-oxetane)butane, bis(3-oxetane) hexane, the reaction product of epichlorohydrin and phloroglucinol, the reaction product of 3-chloro oxetane and pentaerythritol, and the like and mixtures thereof.

Certain epoxide monomers have a tendency during telomerization to form telomers exhibiting unsaturation at or near the end of the telomer in the presence of double metal cyanide catalysts containing acidic metal halide residues unless telomerization is conducted using a basic solvent as described herein. However, in a broader sense the basic solvents will be found useful whenever the functionalities of telomers produced with complex cyanide catalysts are limited by the development of unsaturated groups during telomerization. These epoxides are monosubstituted 1,2-epoxides of the general formula

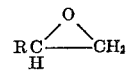

having up to 18 carbon atoms and where R is an alkyl, alkenyl, cycloalkyl, alkoxy carbon, alkenyloxy-carbon or cycloalkyloxy-carbon group and in which breaking of the epoxide ring and shifting of a hydrogen atom from a carbon atom alpha to the epoxide ring to the oxygen atom can occur. The allylic or other unsaturated alcohol formed then acts as a telogen and causes formation of a monohydroxy telomer which is deleterious when the desired products are diols or polyols. Examples of such compounds are 1,2-butane oxide, 2,3-butane oxide, secondary butyl ethylene oxide, isobutyl ethylene oxide, normal butyl ethylene oxide, biallyl monoxide, vinyl cyclohexane monoxide, propyl glycidyl ether, allyl glycidyl ether, 3-tetrahydrofurfuryl ethylene oxide, 1,2-octadecane oxide, phenyl glycidyl ether, crotyl glycidyl ether and the like and mixtures thereof. What is of concern here is the OH functionality derived from the telogen irrespective of the unsaturation originally present in the monomer and which is not affected during the telomerization by the present process. For example, a dihydroxy telomer made from 1,2-butane oxide, a minor amount of allyl glycidyl ether and ethylene glycol can be chain extended with 4,4'-diisocyanato diphenyl methane to make a polyurethane elastomer which can be mixed with compounding ingredients including sulfur, molded and cured to form excellent solvent resistant gaskets, casters and bushings.

CATALYST

The catalyst is most usefully prepared by reacting a transition metal cyanide complex with a metal salt in aqueous media. Removal of a substantial amount or all of the water present in the catalyst is very desirable to enhance the activity of the catalyst although it would appear that removal of all the water is not practicable and may not be desirable. One way to remove most of the water and to enhance even further the activity of the catalyst is to treat it with an additional complexing or coordinating material such as an alcohol, ether, ester, sulfide, ketone, aldehyde, amide and/or nitrile.

In general the catalysts employed in the present invention have the following rational formulae:

$$M_a[M'(CN)_b]_c \text{ and/or } M_a[M'(CN)_r(X)_t]_c.$$

M is a metal ion that forms a metal-oxygen bond that is relatively more stable than the coordinate bond between the metal and the nitrogen atom of the cyano, CN, group. On the other hand, M' is a transition metal ion that has more than one stable valence form and forms a relatively strong covalent bond with the carbon atom of the CN group. An individual catalyst can contain more than one type of M or M' metal ion in its structure. The grouping of these metals, with the cyanide ion sharing electrons with the two metal ions, usually exists in polymeric form as follows: $(M'-CN \ldots M \ldots NC-M'-)_n$ where $n$ is a number, and super 3-dimensional polymers can be formed depending on the coordination numbers of M and M'. Moreover, of those metal ions that produce active cyanide catalysts, all can coordinate with six groups. Most of the hexacyanoferrates (III), including zinc hexacyanoferrate (III), have a cubic face-centered lattice as the basic structure.

The $CN^-$ group in the catalyst is the bridging group, and can constitute all of the bridging groups in the catalyst. However, other bridging groups can be present in the catalyst so long as the catalyst contains at least a majority of $CN^-$ bridging groups. Thus, $r$ and $t$ are numbers and $r$ is greater than $t$. $t$ is zero when only the CN group is the bridging group. Other bridging groups, X in the right-hand formula above, which can be present with the $CN^-$ group, can be $F^-$, $Cl^-$, $Br^-$, $I^-$, $OH^-$, NO, $O^{2-}$, CO, $H_2O$, $NO_2^-$, $C_2O_4^{2-}$ or other acid radical, $SO_4^{2-}$, $CNO^-$ (cyanate), $CNS^-$ (thiocyanate), $NCO^-$ (isocyanate) and $NCS^-$ (isothiocyanate) and so forth.

In the above formulae M is preferably a metal selected from the group consisting of Zn(II), Fe(II), Fe(III), Co(II), Ni(II), Mo(IV), Mo(VI), Al(III), V(IV), V(V), Sr(II), W(IV), W(VI), Mn(II) and Cr(III). On the other hand, M' is preferably a metal selected from the group consisting of Fe(II), Fe(III), Co(II), Co(III), Cr(II), Cr(III), Mn(II), Mn(III), V(IV), and V(V). Even more preferred catalysts of the above formulae are those wherein M is at least one metal selected from the group consisting of Zn(II), Fe(II), Co(II) and Ni(II) and wherein M' is at least one metal selected from the group consisting of Fe(II), Fe(III), Co(II), Co(III), and Cr(III). Also, $a$, $b$ and $c$ are numbers whose values are functions of the valences and coordination numbers of M and M', and the total net positive charge on M times $a$ should be equal essentially to the total net negative charge on $[M'(CN)_b]$ or $[M'[(CN)_r(X)_t]_b]$ times $c$. In most instances $b$ corresponds to the coordination number of M' and is usually 6.

Examples of catalysts which fall within the above description and which may be used are zinc hexacyanoferrate (III), zinc hexacyanoferrate(II), nickel(II), hexacyanoferrate(II), nickel(II) hexacyanoferrate(III), zinc hexacyanoferrate(III) hydrate, cobalt(II) hexacyanoferrate-(II), nickel(II) hexacyanoferrate(III) hydrate, ferrous hexacyanoferrate(III), cobalt(II) hexacyanocobaltate-(III), zinc hexacyanocabaltate(II), zinc hexacyanomanganate(II), zinc hexacyanochromate(III), zinc iodo pentacyanoferrate(III), cobalt(II) chloropentacyanoferrate(II), cobalt(II), bromopentacyanoferrate(II), iron(II) fluoropentacyanoferrate(III), zinc chlorobromotetracyanoferrate(III), iron(III) hexacyanoferrate(III), aluminum dichlorotetracyanoferrate(III), molybdenum(IV), bromopentacyanoferrate(III), molybdenum(VI), chloropentacyanoferrate(II), vanadium(IV), hexacyanochromate(II), vanadium(V), hexacyanoferrate(III), strontium(II), hexacyanomanganate(III), tungsten(IV), hexacyanovanadate-(IV), aluminum chloropentacyanovanadate(V), tungsten-(VI) hexacyanoferrate(III), manganese(II) hexacyanoferrate(II), chromium(III) hexacyanoferrate(III), and so forth. Still other cyanide complexes can be used such as $$Zn[Fe(CN)_5NO],$$

$Zn_3[Fe(CN)_5NO_2]_2$, $Zn[Fe(CN)_5CO]$, $Zn[Fe(CN)_5H_2O]$, $Fe[Fe(CN)_5OH]$, $Cr[Fe(CN)_5NCO]$, $Cr[Fe(CN)_5NCS]$, $Al[Co(CN)_5CNO]$, $Ni_3[Mn(CN)_5CNS]_2$, and the like.

In general, the complex catalysts of this invention are prepared by reacting aqueous solutions of salts which which give a precipitate of a metal salt of a transition metal complex anion. For example, $$M_aZ + M''[M'(Y)_b]_c \rightarrow M_a[M'(Y)_b]_c + M''Z$$

where M is a metal ion which precipitates complex anion salts e.g., $Zn^{++}$, $a$, $b$ and $c$ in this equation are numbers but are not necessary equal on both sides of the equation since their values, again, are functions of the valences and coordination numbers of M, M' and M'' and possibly Y and Z. Z is a halide or other anion e.g., $Cl^-$; M'' is a hydrogen ion or a metal ion whose complex anion salts are soluble in water or other solvent e.g., $K^+$ or $Ca^{++}$; M' is a complexing transition metal ion, e.g., $Fe^{+++}$; and Y is a complexing anion, e.g, $CN^-$. Excess $M_aZ$ may be used.

Little if any of the other bridging groups or ligands which can be used to replace part of the cyano groups $(CN^-)$ are usually introduced into the complex by use of the salt MaZ. Rather, they are introduced into the complex by employing the $M''[M'(Y)_b]_c$ salt containing the ligand or more correctly a salt having the formula $M''[M'[(CN)_r(X)_t]_b]_c$ in which $t$ is a number dependent on the valence of M'' and the other symbols used are the same as identified above. For example, instead of potassium ferricyanide, $K_3Fe(CN)_6$, there are used $K_2[Fe(CN)_5NO]$,
$K_3[Fe(CN)_5NO_2]$,
$K_2[Fe(CN)_5CO]$,
$K_2[Fe(CN)_5H_2O]$,
$K_3[Fe(CN)_5Cl]$,
$K_3[Fe(CN)_4BrF]$,
$K_3[Co(CN)_5I]$,
$K_3[Co(CN)_5OH]$,
$Na_3[Co(CN)_5CNO]$,
$Na_3[Co(CN)_4(CNS)_2]$,
$Ca_3[Fe(CN)_5NCO]_2$,
$K_3[Mn(CN)_5NCS]$ and so forth. Examples of the preparation of such starting materials are:

(I) $K_3Fe(CN)_6 + Cl_2 \rightarrow K_3Fe(CN)_5Cl + CNCl$,
and
(II) $K_3Fe(CN)_5Cl + H_2O \rightarrow K_2Fe(CN)_5H_2O + KCl$.

They also, may be prepared by boiling a material such as $K_3Fe(CN)_6$ in aqueous KCl, oxalic acid or other salt and so forth. Still other methods can be used. For example, see "Cyanogen Compounds," Williams, 2nd ed., 1948, Edward Arnold and Co., London, p. 252 and elsewhere.

The salts should be reacted in substantial concentration in aqueous media at room temperature and, also, preferably in air or under atmospheric pressure. However, heat can be used and the catalyst can be prepared under conditions substantially or entirely free of oxygen. The salts which are used are the chloride, fluoride, bromide, iodide, oxynitrate, nitrate, sulfate or carboxylic acid salt, such as the acetate, formate, propionate, glycolate and the like, salt of a M element of the group as defined above or other M salts and mixtures thereof. Preferred are the M halide salts or halide salt forming materials since they provide catalysts having the best activity. An excess of the M salt is usually reacted with a Na, K, Li, Ca etc. M' cyanide compound and so forth. Mixtures of these salts can be used.

If the resulting precipitate is then just filtered or otherwise separated from the water, such as by using a centrifuge and dried without further washing, it has been found that the precipitated complex is non-catalytic, that is, it fails to polymerize the organic oxides in any practical amount.

Apparently, extraneous ions in the solution used to form the precipitate are easily occluded with the complex. Anions ($Cl^-$ etc.) coordinate to the positively charged metallic ions in the lattice, and cations ($K^+$) coordinate to the negatively charged nitrogen atoms of the cyanide bridging groups. These ions, especially those anions coordinating to or associated with the M atom, inhibit catalytic activity or prevent the complex from causing appreciable polymerization. Additionally, these ions, for example easily ionizable Cl, may terminate the polymer chain.

On the other hand, if the complex is treated or washed one or more times with water, some or a substantial number of these occluded ions are removed from the precipitate or from the surface of the crystal lattice and the complex becomes an active catalyst for the polymerization of organic cyclic oxides. It is desired to remove all or a substantial amount of these occluded ions to enhance as much as possible the catalytic activity of the complex. However, from a practical standpoint it may not be possible to remove all of them due to the steps and times required. Moreover, some of these ions are probably trapped in the crystal lattice and cannot be removed easily. However, their presence should be reduced as much as possible. After the water wash the complex will have an appreciable amount of water depending on the number of washings and the degree of drying following water washing. These resulting catalysts will then have the following rational formulae:

$$M_a[M'(CN)_b]_c \cdot (H_2O)_d$$

and/or $M_a[M'(CN)_r(X)_t]_b]_c \cdot (H_2O)_d$ where $d$ is a number and where M, M', CN, X, $a$, $b$, $c$, $r$ and $t$ have the significance as defined supra. If the catalyst is dried or gently heated for extended periods of time $d$ can be or approach zero.

Moreover, to obtain the best activity of the catalysts for polymerization, an organic material or organic complexing agent is added to the catalyst precipitate preferably before it is centrifuged or filtered, is mixed with the water during washing of the precipitate, is used alone as the washing medium provided it replaces or dissolves the occluded ions, or is used to treat or wash the precipitate after it has been washed with water to replace at least a portion of the water. Sufficient of such organic material is used to effect these results in order to activate and/or enhance the activity of the catalyst. Such organic material, also, should desirably coordinate with the M element or ion and should desirably be one or more relatively low molecular weight organic materials. The organic material should preferably be water miscible or soluble or substantially so, have a substantially straight chin or be free of bulky groups and have up to 18 carbon atoms, even more preferably only up to 10 carbon atoms, and be a liquid at room temperature.

Examples of organic materials for use in treating the double metal cyanide catalysts are alcohols, aldehydes and ketones such as methanol, ethanol, propanol, isopropanol, butanol, hexanol, octanol, and t-butyl alcohol; formaldehyde, acetaldehyde, propionaldehyde, butyraldehyde, i-butyraldehyde, glyoxal, benzaldehyde and tolualdehyde; and acetone, methyl ethyl ketone, 3-pentanone, 2-pentanone, and 2-hexanone. Ethers such as organic cyclic polyethers are also useful. Examples of such cyclic ethers are m-dioxane, p-dioxane, trioxymethylene, paraldehyde and so forth. Aliphatic saturated monoethers and acyclic aliphatic polyethers are also useful as treating agents. Examples of such ethers are ethyl ether, 1-ethoxy pentane, bis-(b-chloro-ethyl) ether, bis-(b-ethoxy ethyl) ether or diglyet, butyl ether, ethyl propyl ether, bis-(b-methoxy ethyl) ether or diglyme, ethylene glycol dimethyl ether, triethylene glycol dimethyl ether, dimethoxy methane, acetal, methyl propylether, diethoxymethane, octaethylene glycol dimethyl ether and so forth of which the acyclic polyethers are preferred. Still other organic complexing agents can be used such as the amides, esters, nitriles and sulfides of which the following are examples: formamide, acetamide, propionamide, butyramide, and valeramide; amyl formate, ethyl formate, n-hexyl formate, n-propyl formate, methyl acetate, ethyl acetate, methyl propionate, and triethylene glycol diacetate; acetonitrile, propionitrile and butyronitrile; and dimethyl sulfide, diethyl sulfide, dibutyl sulfide, dipropyl sulfide, and diamyl sulfide and so forth. Preferred are ethers having more than one oxygen atom and which form a chelate bond with respect to M. Mixtures of these organic treating agents can be used. Excess of these organic treating agents which are not complexed with the catalyst, especially the high boiling compounds, can be removed by extraction with pentane, hexane and so forth.

After treatment with the above organic material the catalysts have the following rational formulae:

$$M_a[M'(CN)_b]_c \cdot (H_2O)_d \ (R)_e$$

and/or $$M_a[M'[(CN)_r(X)_t]_b]_c \cdot (H_2O)_d \cdot (R)_e.$$

In these formulae $d$ can be a number, fractional number, or zero and $e$ is a number which, since the catalyst is a nonstoichiometric complex in which various amounts of $H_2O$ and R may be bonded to the various M's, may be a fractional number rather than an integer. $e$ is zero when the complex is not treated with R. R is one or more of the complexing organic amides, alcohols, aldehydes, esters, ethers and so forth shown above. M, M', CN, X, $a$, $b$, $c$, $r$ and $t$ have the significance as discussed above. In general, $d$ and $e$ will have values corresponding at least in part to the coordination number of M. However, both the $H_2O$ and R can be occluded in the crystal lattice. In general the sum of the oxygen, nitrogen and/or sulfur or other coordinating atoms of $H_2O$ and R (depending on the organic complexing agent) is equal to from about 0.1 up to about 5.0 g.-atoms maximum per g.-atom of M. Subsequent drying or heating of the catalyst to remove all of the $H_2O$ and/or R results in a loss or a substantial decrease in the catalytic activity of the catalyst.

As shown by the previous formulae if the organic complexing material is not used, R will not be present, and hence, e can be zero. Thus, the general formula for these catalysts is $M_a(K)_c \cdot (H_2O)_d \cdot (R)_e$ where M, $H_2O$, R, *a*, *c*, *d*, and *e* have the significance as indicated above, where *d* and *e* also can be or approach zero, where K is selected from the group consisting of $M'(CN)_b$ and $$M'[(CN)_r(X)_t]_b,$$

and where M', CN, X, *b*, *r* and *t* have the significance as indicated above. With regard to the subscripts in the above formulae, number includes whole numbers as well as fractional numbers.

It is to be noted that if the catalyst is merely filtered or centrifuged from the solution in which it was prepared and washed with one of the polymerizable cyclic oxide monomers, it shows little or no catalytic activity for subsequent polymerization of said monomers. On the other hand, if the catalyst is washed with water and the ether, or the ether or other organic complexing compound as described above, and subsequently with one of the polymerizable cyclic oxide monomers a storable initiator for polymerization is obtained.

After the washing steps, the precipitate or catalyst can be used as such. However, it is preferred to dry it to remove excess treating agent and any remaining easily removable $H_2O$ and to provide it in a form which is easily handled. Such drying is readily accomplshed my subjecting the catalyst to a vacuum or by heating it in air or in an inert atmosphere at a temperature up to about 100° C. It is more preferred to dry under a vacuum (for example 0.5–1 mm. Hg) at low temperature, for example, about room temperature (25° C.) or in a stream of air, nitrogen or inert gas at 25° C. or at least at a temperature above about 5° C. The heat-treated catalyst has generally to be used at higher concentrations than the vacuum-treated catalyst. As the temperature during drying is increased, the activity of the catalyst for polymerization is decreased. Thus, high temperatures are to be avoided. 200° C. may be considered as a maximum temperature. During heat treatment, it is believed that some of the oxygenated and other organic treating compounds weakly coordinated to M may be lost to leave voids in the crystal lattice, and the atoms in the crystal lattice may rearrange to satisfy the coordination requirements of the metals. Heating may also remove $CN^-$ as $(CN)_2$ and reduce M'. Also, the molecular weight of the catalyst can increase, and the number of "exposed" metal ions on the surface of the catalyst or the active sites can be reduced, thus reducing activity of the catalyst for epoxide and oxetane polymerization. It, thus, is preferred that the drying step leave as many as possible M ions exposed in the lattice of the complex and that the catalyst be in finely divided or particulate form to obtain the best results for polymerization. Moreover, freshly prepared (precipitated, washed and dried) catalysts are preferred rather than catalysts which have been aged or stored for extended periods of time since the catalysts decompose slowly when stored. The catalyst can be stored for longer times at lower temperatures.

It is not precisely known what occurs to make the double metal cyanide complexes, especially those treated with the above organic complexing materials (ether, etc.), so useful in polymerizing organic cyclic oxides. While the following discussion relates to treatment of the double metal cyanide catalyst with ethers, it will be appreciated that it will generally also apply to treatment of such catalyst with the other organic treating agents shown above It has been shown that, for example, with respect to zinc hexacyanoferrate, as an illustration, when the precipitate is washed with dioxane, a more effective catalyst is produced. During this treatment with dioxane, it is believed that a number of reactions take place: (1) some of the chloride ions in the lattice are oxidized, resulting in the reduction of Fe(III) to Fe(II); (2) the chlorine from reaction (1) reacts with the water and ether present during the wash-treatment to give $Cl^-$, and chlorinated ether; (3) the successive washes remove some of the products of reaction (2); and (4), the oxygen atoms of the ether apparently coordinate to the zinc ions in the lattice, rearranging the lattice structure by inserting dioxane groups between the zinc ions as follows:

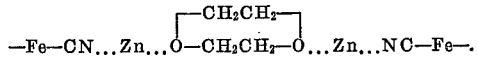

Thus, in the case of some of the dioxane-zinc hexacyanoferrate complexes, elemental analyses revealed that they were apparently nonstoichiometric complexes having the formula $Zn_3[Fe(CN)_6]_2(C_4H_8O_2)_x(H_2O)_y$, where $y=1$ to 2 and $x=2.5$ to 3.1. According to infrared and elemental analyses some of the dioxane in the complex may be chlorinated and some of the $H_2O$ may be in the form of —OH or —O— groups. As ordinarily prepared, these complexes generally contained from about 4 to 5% $Cl^-$ and a smaller amount of $K^+$.

If the catalyst is prepared with $Zn(NO_3)_2$ instead of $ZnCl_2$, approximately 50% of the normal amount of dioxane is incorporated in the catalyst. This catalyst is not as effective as the one prepared from the chloride.

Although a great part of the iron in the ether (or other organic complexing moiety)-zinc hexacyanoferrate complex is believed to be Fe(II), as a result of the oxidation-reduction reaction that occurs during preparation, the dioxane complex prepared from $ZnCl_2$ and $K_4Fe(CN)_6$ is not as active even at polymerization temperatures of 80° C. Analyses showed that a reduced amount of dioxane was incorporated in such complexes and the chlorine content was high.

The reduced catalytic effect when using $Zn(NO_3)_2$ or $K_4Fe(CN)_6$ in the preparation of the catalyst complex is apparently related to the mechanism of the ether-hexacyanoferrate reaction. This mechanism may be viewed as follows. As the chloride ions of the surface zinc ions in the crystal lattice transfer electrons into the Zn . . . NC-Fe grouping, ether molecules can displace the resulting chlorine atoms and form ether-zinc coordinate bonds. For example, $$Zn_3[Fe(CN)_6]_2(KCl)_y + yROR \rightarrow Zn_3K_y[Fe(CN)_6]_2(ROR)_y + yCl°$$

(Note: *y* in the above equation may not be same as in the preceding formulae.)

The driving force for this reaction is the removal of $Cl_2$ by solution of the gas in the water and ether and the reaction of $Cl_2$ with the ether.

This oxidation-reduction reaction and displacement of the chlorine by ether is accomplished by a change in the crystal lattice. According to elemental and infrared analyses, most of the zinc ions in the lattice appear to form coordination bonds with from 1 to 4 oxygen atoms. The oxygen atoms of both the water and the ether are involved in this coordination. X-ray analysis and density measurements appeared to confirm this lattice change. Thus, the oxygen atoms of the ether compete with the CN groups of the $Fe(CN)_6$ anion to produce a polymeric structure with more exposed zinc ions as shown below:

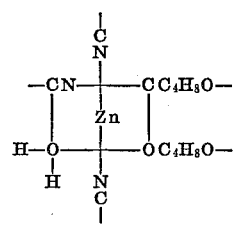

This process of "opening up" the lattice is aided by the presence of water during the ether treatment. Apparently, the water dissolves $Fe(CN)_6$ anion sections in the lattice that are coordinated to $K^+$ ions, and more of the lattice becomes exposed to the ether during the hexacyano-ferrate-ether reaction.

One technique for removing water from the lattice structure is to displace the water with ether and remove the former by azeotropic distillation. The distillation is best carried out under vacuum at room temperature or thereabouts, i.e., 5 to 40° C., in order to prevent decomposition of the complex which may occur at elevated temperatures as discussed supra. In any event temperatures should not go above 100 or 200° C. as discussed supra or below about 5° C. Hexane or other relatively low-boiling, inert, and essentially water-insoluble solvents such as heptane, toluene, benzene, pentane, 2-chlorobutane, cyclohexane, cyclopentane, ethylene chloride, and butane can be used in this distillation to separate the water from the ether as the distillate collects in a trap. In this way, all displaceable water is removed, however, some water usually invariably remains trapped in the lattice. Other methods can be used to remove the water.

Chloride ions can inhibit the polymerization reaction. Several methods for reducing the ionizable chlorine or other ionizable anions in the catalysts can be used. For example, in one method the catalyst is washed with a solution containing ether and water and the soluble chloride salt is removed. In another method the zinc hexacyanoferrate is prepared by reacting compounds such as

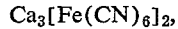
$Ca_3[Fe(CN)_6]_2$, $AlFe(CN)_6$, or $Li_3Fe(CN)_6$ with $ZnCl_2$. The corresponding halide that forms and occludes on the crystals of $Zn_3[Fe(CN)_6]_2$ is then removed by the ether during the washing operation. When the preparations are made with $K_3Fe(CN)_6$, ether-insoluble KCl is produced. However, when zinc hexacyanoferrate is prepared by the second method above, ether (organic treating agent) soluble $CaCl_2$, $AlCl_3$, or $LiCl$ is produced. Also, where ions such as $Cl^-$ are covalently bound to the complex, they do not apparently adversely affect polymerization of the epoxides and oxetanes. In fact, the organic complexing materials like the chlorinated ethers can improve the efficiency of the catalyst, because the halogenated ethers can be displaced more readily by the epoxides and oxetanes to start polymerization than the nonhalogenated ethers.

When the catalyst is treated with polyethylene glycol ethers, a very active catalyst is obtained. They apparently form a chelate bond to the zinc ion. The formation of a chelate complex increases the driving force of the hexacyanoferrate-ether reaction and makes for a very open lattice because polymeric coordination through the oxygen atom is prevented. The coodination of

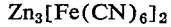
$Zn_3[Fe(CN)_6]_2$ with diglyme (dimethyl ether of diethylene glycol) is shown below:

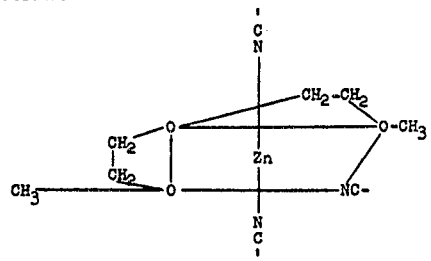

The use of diglyme and diglyet (dimethyl and diethyl ethers, respectively, of diethylene glycol) in the usual catalyst preparation was found to increase the efficiency of the catalyst.

Moreover, the addition of a substantial amount, such as 30–70% by volume of the total fluid, of the ether (or other organic treating agent) to freshly precipitated hexacyanoferrate in water greatly enhanced the activity of the catalyst. According to elemental analysis, this complex may have some $(ZnCl)^+$ ion in its structure.

It, thus, would appear that the best catalyst for oxide polymerization are those that contain the greatest amount of Zn-O ether bonds, rather than $Zn-OH_2O$ bonds, and the least amount of ionizable chlorine. The more active catalysts, also, are prepared by using an excess of zinc chloride and adding the $K_3Fe(CN)_6$ solution to the chloride.

The catalyst is used in a minor amount by weight only sufficient to catalyze the reaction. Large amounts are usually wasteful and may in time cause reversion or subsequent decomposition of the polymer or telomer. In some cases, use of large amounts of telogen to reduce the molecular weight may require extra amounts of catalysts. Also, for example, one telogen may require the use of more catalyst than another telogen. In general, there is used a total of from about 0.001 to 15% by weight of the catalyst based on the total weight of the polymerizable or telomerizable cyclic oxide monomer or monomers employed during telomerization. However, it is preferred to use from about 0.01 to 1.00% by weight of the catalyst based on the total weight of the monomer(s).

In the case of many inorganic preparations where precipitates are to be formed, it is usual to employ an excess of one of the reactants to drive the reaction forward or to obtain the desired yield. Consequently, the precipitate which forms can contain some of one or more of the reactants or a co-precipitate. In the preparation of the double metal cyanide catalysts it is generally desirable to employ an excess of an M metal salt, i.e., $ZnCl_2$, which is co-precipitated with the desired double metal cyanide. Washing with water removes some of the salts like the excess $ZnCl_2$. Repeated washings will remove more of the $ZnCl_2$ until the catalyst has a very low chloride or $ZnCl_2$ content. Such a catalyst is useful in the preparation of telomers wherein the unsaturation is virtually nil although more catalyst must be used. Moreover, the repeated washings and dryings of the catalyst are time consuming and the resulting telomer has a broader molecular weight distribution. It is preferred to wash with water and the organic complexing agent for a limited number of times or to a limited degree to obtain the highest catalytic activity. A telomer or polymer with a broad molecular weight distribution may be desirable for some purposes but they are generally of higher viscosity and difficult to mix. It is preferred in making polyurethane foams to have a narrower molecular weight distribution for the polyol in order to better control the foaming action and final properties of the foam and to provide polymers wih much reduced amounts of unsaturation. On the other hand, the catalyst need not be washed so extensively with water and the complexing agent but rather in an amount sufficient to remove a substantial amount of the zinc salt yet provide a measurable amount of the zinc salt in the catalyst which also contains the complexing agent. Such a catalyst possibly due to the presence of the salt may be considered as acidic and with certain monomers as defined above

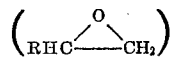

will provide telomers having undesirable unsaturation. On the other hand, if a basic solvent is used during the telomerization, such acidic catalysts will provide the desired telomers with little or no unsaturation and with a narrower molecular weight distribution employing considerably less catalyst. Such catalysts will have the general formula $M_a(K)_c \cdot (H_2O)_d \cdot (R)_e \cdot (M(J)_m)_n$ where M, a, K, c, d, R and e are the same as discussed above. m is a number equal to the valence of M and n is a number (fractional or whole). J is a halide of a metal salt which gives a precipitate of a metal salt of a transition metal complex halide, for example, chloride, and bromide. Further information on the preparation of double metal cyanide catalysts is disclosed in U.S. Pat. Nos. 3,278,457; 3,278,458; 3,278,459 and 3,404,109.

Mixtures of these catalysts can be used.

EXAMPLES

The following examples will serve to illustrate the present invention with more particularity to those skilled in the art:

Example 1

The catalyst, $Zn_3[Fe(CN)_6]_2 \cdot H_2O \cdot dioxane$ in one case and $Zn_3[Co(CN)_6]_2 \cdot H_2O \cdot acetone$ in another, was added to a citrate bottle flushed with $N_2$, followed by propylene oxide and then acetone as the telogen, flushed with $N_2$, and capped. The capped bottle was then rotated in a constant temperature water bath for a predetermined period of time. The amounts of materials used, time of telomerization, bath or telomerization temperature and results obtained are shown in Table A, below:

a mortar and pestle and then placed in a nitrogen flushed bottle. The catalyst was $Zn_3[Fe(CN)_6]_2 \cdot H_2O \cdot dioxane$. Vacuum treatment of a portion of the catalyst at about 100° C. would show that it contained about 13% by weight of liquid analyzing 20–30% water and 80–70% dioxane.

Preparation of catalyst for Runs 3A–B and 4A above. 55.04 gms. of calcium cobalticyanide was dissolved in 400 ml. of water. This was added dropwise to 44.98 grams of zinc chloride (10% excess) dissolved in 200 ml. of water. The catalyst was then centrifuged and the decant discarded. The catalyst was then washed with acetone, centrifuged and the decant discarded. The procedures of washing, centrifuging and decanting were repeated three more times. The catalyst was then placed in a vacuum oven at room temperature to dry. The dried material was pulverized by means of a mortar and pestle. The zinc cobalticyanide, $Zn_3[Co(CN)_6]_2 \cdot H_2O \cdot acetone$, obtained

TABLE A

| Run No. | Catalyst Formula [1] | Concentration, wt. percent [2] | Acetone, wt. percent [2] | Temp., °C. | Time, hrs. | Conversion, percent | Appearance at about 25° C. [3] | Hydroxyl content, mm./g. | Unsaturation, mm./g. | Viscosity, cps. |
|---|---|---|---|---|---|---|---|---|---|---|
| 1: | | | | | | | | | | |
| A | $Zn_3[Fe(CN)_6]_2$ | 0.10 | 2 | 80 | 18 | 84 | HO | 0.31 | 0.11 | |
| B | | 0.10 | 10 | 80 | 18 | 80 | LO | 0.76 | 0.25 | |
| C | | 0.20 | 2 | 80 | 18 | 100 | MO | 0.35 | 0.11 | |
| D | | 0.20 | 10 | 80 | 18 | 100 | LO | 0.84 | 0.26 | |
| 2: | | | | | | | | | | |
| A | $Zn_3[Fe(CN)_6]_2$ | 0.20 | 2 | 60 | 18 | 100 | HO | 0.58 | [4] .013 | |
| B | | 0.20 | 10 | 60 | 18 | 100 | MO | 1.14 | [4] .022 | 1,121 |
| 3: | | | | | | | | | | |
| A | $Zn_3[Co(CN)_6]_2$ | 0.03 | 2 | 80 | 24 | 71 | MO | 0.39 | 0.14 | 2,803 |
| B | | 0.03 | 10 | 80 | 24 | 76 | LO | 0.83 | 0.29 | 287 |
| 4A | $Zn_3[Co(CN)_6]_2$ | 0.01 | 0 | 70 | 24 | 17 | ([5]) | | | |

[1] Catalyst also contained $H_2O$ plus dioxane or acetone as indicated above.
[2] Based on the weight of the propylene oxide.
[3] L=light; M=medium; H=heavy; O=oil.
[4] After treatment with ion exchange resin.
[5] Solid.

Preparation of catalyst for Runs 1A–D and 2A–B, above.

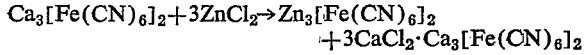

dissolved in water was added dropwise to $ZnCl_2$ dissolved in water. After sufficient mixing, the zinc ferricyanide was centrifuged, and the clear liquid was discarded. The zinc ferricyanide was then washed with dioxane. After sufficient agitation, the solution was centrifuged and the clear liquid discarded. The steps of dioxane washing, centrifuging and discarding the liquid were repeated four times. After the 4 washes, the catalyst was dried at room temperature in a vacuum desiccator. After the catalyst in the vacuum desiccator was dry, it was ground up with was a white powder. A portion of a catalyst prepared in the same way was placed in a Pyrex tube at 100° C. Dry nitrogen gas (lamp grade) was blown through the tube and into a U-tube in a Dry Ice bath. About 12.8% by weight of liquid was collected of which about 75% ±5% was acetone and about 25% ±5% was water as determined by gas chromatography.

Example 2

Propylene oxide was polymerized with

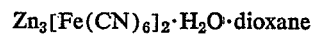

catalyst using various telogens according to the method of Example 1, above. The polymerization conditions and results obtained are shown in Table B, below:

TABLE B

| Run No. | $Zn_3[Fe(CN)_6]_2$ concentration, Wt. percent [1] | Telogen, type | Wt. percent [1] | Temperature, °C. | Time, hrs. | Conversion percent [2] | Appearance of polymer at about 25° C. [3] |
|---|---|---|---|---|---|---|---|
| 20: | | | | | | | |
| A | 0.20 | Hexanedione-2,5 | 4 | 80 | 20 | 40 | HO. |
| B | 0.20 | do | 20 | 80 | 20 | 10 | MO. |
| 21: | | | | | | | |
| A | 0.16 | Propionaldehyde | 2 | 80 | 16 | 64 | MO. |
| B | 0.16 | do | 10 | 80 | 16 | 16 | LO. |
| 22: | | | | | | | |
| A | 0.16 | Methylethylketone | 2 | 60 | 16 | 100 | HO. |
| B | 0.16 | do | 10 | 60 | 16 | 98 | HO. |
| 23: | | | | | | | |
| A | 0.16 | Cyclopentanone | 2 | 60 | 16 | 83 | LG. |
| B | 0.16 | do | 10 | 60 | 16 | 51 | MO. |
| 24: | | | | | | | |
| A | 0.16 | Methanol | 0.2 | 60 | 16 | 100 | HG. |
| B | 0.16 | do | 2.0 | 60 | 16 | 100 | HO. |
| C | 0.16 | do | 10.0 | 60 | 24 | 60 | LO. |
| 25: | | | | | | | |
| A | 0.16 | tert-Butanol | 0.2 | 60 | 16 | 100 | Tacky solid. |
| B | 0.16 | do | 2.0 | 60 | 16 | 100 | HG. |
| C | 0.16 | do | 10.0 | 60 | 24 | 77 | HO. |

[1] Based on the weight of the monomer.
[2] Monomer to Polymer.
[3] H=heavy; M=medium; L=light; O=oil; G=grease.

The catalyst for Runs 20A–B to 25A–C, above, was prepared by the following procedure. 49.5 gms. of $$K_3Fe(CN)_6$$

were dissolved in 300 ml. of water. 76 gms. of $AgNO_3$ dissolved in 100 ml. of water were added to the $$K_3Fe(CN)_6$$

solution. After sufficient stirring the $Ag_3Fe(CN)_6$ was filtered from the solution. The $Ag_3Fe(CN)_6$ calculated to weigh 80 grams was washed with 800 ml. of water and filtered again. After two washings with 800 ml. of water, the $Ag_3Fe(CN)_6$ was added to 500 ml. of water. 27 gms. of $CaCl_2$ dissolved in 100 ml. of water was added to the $Ag_3Fe(CN)_6$ slurry. After sufficient agitation, the AgCl was filtered out of the solution and discarded. The solution calculated to contain 40.5 gms. of $Ca_3[Fe(CN)_6]_2$ was placed in a 1000 ml. beaker. 33.4 gms. of $ZnCl_2$ dissolved in 60 ml. of $H_2O$ was added to the $Ca_3[Fe(CN)_6]_2$ solution. After sufficient agitation, the solution and precipitate were centrifuged. The solution was discarded and the precipitate was washed with dioxane. After washing with dioxane, the precipitate was centrifuged and the dioxane discarded. The washing, centrifuging and decanting (discharge of dioxane) was repeated three times. The catalyst was then dried under a vacuum at room temperature. The density of the catalyst was 0.2507 g./cc.

Example 3

The method of this example was similar to the methods of the preceding examples except that the catalyst used was the same type of catalyst as used in Example 1, Runs 3A–B and 4A, above, other telogens were used, and in some cases, other monomers were employed. The amounts of monomers used, telomerization conditions and results obtained are shown in Table C, below:

TABLE C

| | Monomer(s) | | | | Telomerization conditions | | | | |
|---|---|---|---|---|---|---|---|---|---|
| | | | | | Catalyst, wt. percent [4] | Telogen | | | |
| Run number | Monomer | Mole percent [1] | Comonomer | Mole percent [1] | | Type | Mole percent [5] | Temp., °C. | Time, hours |
| 30: | | | | | | | | | |
| A | PO [9] | 100 | | | 0.04 | Acetone | 9.1 | 60 | 24 |
| B | PO | 100 | | | 0.04 | do | 2.0 | 60 | 24 |
| 31A | PO | 100 | | | 0.05 | do | 0.23 | 60 | 24 |
| 32A | PO | 97 | AGE [2] | 3 | 0.048 | do | 7.0 | 60 | 24 |
| 33: | | | | | | | | | |
| A | PO | 100 | | | 0.16 | TMPAE [6] | 5.0 | 80 | 24 |
| B | PO | 100 | | | 0.08 | TMPAE | 2.5 | 80 | 24 |
| C | PO | 100 | | | 0.04 | TMPAE | 3.2 | 80 | 24 |
| D | PO | 100 | | | 0.04 | TMPAE | 0.6 | 80 | 24 |
| 34: | | | | | | | | | |
| A | PO | 100 | | | 0.04 | Glycidol | 1.0 | 80 | 24 |
| B | PO | 100 | | | 0.04 | do | 0.3 | 80 | 24 |
| 35: | | | | | | | | | |
| A | PO | 100 | | | 0.12 | do | 3 | 80 | 24 |
| B | PO | 100 | | | 0.12 | do | 1 | 80 | 24 |
| 36: | | | | | | | | | |
| A | 1,2BO [3] | 100 | | | 0.04 | Acetone | 9 | 80 | 24 |
| B | 1,2BO | 100 | | | 0.04 | do | 3 | 80 | 24 |
| C | 1,2BO | 100 | | | 0.04 | do | 1 | 80 | 24 |

| | Results | | | | |
|---|---|---|---|---|---|
| Run number | Yield, percent [7] | Kinematic viscosity | OH number | Unsaturation, mm./g. | Acid No. | Remarks |
| 30: | | | | | | |
| A | 75 | | 66.6 | 0.031 | *0.14 | *Foams prepared from mixtures containing 50 and 75% of the material together with LG-56. Dry and stable although weaker than control.[10] |
| B | 100 | 1,261 | 32.7 | 0.051 | 0.04 | |
| 31A | | [8] 0.68 | 10–12 | 0.01 | 0.1 | M.W. (Osmotic)—37–57×10 [3]. |
| 32A | 97.5 | 329 | 54 | .63 | 0.06 | |
| 33: | | | | | | |
| A | | 234 | 106 | | | |
| B | | 557 | 61.6 | | | |
| C | | 9,263 | 40.3 | | | |
| D | | 64,646 | 18.8 | | | |
| 34: | | | | | | |
| A | [11] 28 | | | | | |
| B | [12] 36 | | | | | |
| 35: | | | | | | |
| A | | Heavy oil | | | | |
| B | | Thick paste | | | | |
| 36: | | | | | | |
| A | | Medium oil | | | | |
| B | | Heavy oil | | | | |
| C | | Very Heavy oil | | | | |

[1] Based on total 100 mol percent of monomer(s).
[2] Allyl glycidyl ether.
[3] 1,2-epoxy butane.
[4] Based on total weight of monomers charged.
[5] Based on total of 100 mole percent of monomer(s).
[6] Trimethylol propane mono allyl ether.
[7] Monomer to polymer. Also, appearance of polymer at about 25° C.
[8] Inherent viscosity in benzene.
[9] Propylene oxide.
[10] LG-56, "Niax Triol LG-56," is a propylene oxide adduct of glycerol containing substantially 90-95% secondary OH radicals, an OH number of about 56, and an average molecular weight of from about 2,800-3,100. Experience has shown that appreciable amounts of monofunctional material in polyurethane foam formulations leads to chain breaking and collapse while significant amounts of non-functional material gives the polyurethane foam a sticky feel. The foams (*) were prepared by the oneshot process.
[11] Sticky paste.
[12] Tacky solid.

Example 4

The method of this example was similar to the methods of the preceding examples. The catalyst used was prepared in a manner similar to the catalyst of Example 1, Runs 3A–B and 4A, above; triols were used as the telogens; telomerizations were run for 24 hours; and propylene oxide was the monomer. The polymerization conditions and results obtained are shown in Table D, below:

TABLE F.—POLYPROPYLENE ETHER GLYCOLS

| Molecular wt. from hydroxyl number | Unsaturation percent of end groups | Monofunctionality, mol percent |
|---|---|---|
| 1,025 [1] | 0.46 | 0.92 |
| 2,000 [1] | 3.84 | 7.68 |
| 3,025 [1,2] | 12.00 | 24.00 |
| 4,025 [1,2] | 16.00 | 32.00 |
| 1,602 [3] | 0.73 | 1.46 |
| 2,940 [3] | 1.35 | 2.70 |
| 3,545 [3] | 2.40 | 4.80 |

[1] Commercially available polypropylene ether glycols.
[2] Calculated from supplier's products bulletin.
[3] Polypropylene ether glycols prepared as described above by present invention.

TABLE D

| Run number: | Catalyst conc., wt. percent [1] | Telogen Type | Telogen Conc., wt. percent [1] | Temp., °C. | Yield, percent [1] | Molecular wt. Calc. | Molecular wt. Found | Viscosity |
|---|---|---|---|---|---|---|---|---|
| 40 | .033 | [2] | .67 | 60 | 37 | 15,000 | [4] 9,500 | [6] 1.37 |
| 41 | .067 | [2] | 2.7 | 60 | 55 | 5,300 | [4] 4,670 | [6] .82 |
| 42 | .39 | [2] | 10.7 | 60 | 72 | 2,160 | [4] 2,400 | [6,8] .17 |
| 43 | .53 | TMP [3] | 10.7 | 50 | 90 | 1,260 | [5] 1,310 | [7] 579 |
| 44 | .13 | [2] | 5.4 | 50 | 100 | 5,100 | [4] 3,900 | [7] 2,798 |
| 45 | .26 | [2] | 10.7 | 50 | 100 | 2,700 | [5] 2,330 | [7] 887 |

[1] Based on weight of monomer charged.
[2] CP-260, tri(propylene oxide) adduct of glycerol, Dow Chemical Co., molecular weight about 260, generally 1,2,3-tri(2-hydroxy-propoxy) propane.
[3] Trimethylol propane.
[4] End group analysis assuming triol formation.
[5] Mecrolab Osmometer.
[6] Intrinsic in benzene.
[7] Kinematic cs. at 25° C.
[8] Crosslinked when reacted with diisocyanate; 86.5% insoluble in benzene. This shows that the polyol obtained had a functionality greater than two.

Example 5

The method of this example was similar to that of the preceding examples. One of the catalysts used was a $Zn_3[Co(CN)_6]_2$ compound prepared using acetone according to the method of Example 1, above. Another $Zn_3[Co(CN)_6]_2$ catalyst was prepared according to the method of Example 1, above, except that glyme, ethylene glycol dimethyl ether, was used in place of acetone. The monomer was propylene oxide, various multifunctional telogens were used, and the polymerization conditions and results obtained are shown in Table E, below:

TABLE G
Polypropylene ether triols

| Molecular wt. from hydroxyl number: | Unsaturation percent of end groups |
|---|---|
| 3030 [1] | 3 |
| 3000 [1] | 4 |
| 4040 [1] | 9 |
| 4000 [1] | 8 |
| 5000 [1] | 12 |
| 3900 [2] | 1.5 |
| 3900 [2] | 1.2 |

[1] Commercially available polypropylene ether triols.
[2] Propylene ether triols prepared as described above by present invention.

TABLE E

| Run number | $Zn_3[Co(CN)_6]_2$ catalyst prepared with— | Wt. percent catalyst based on wt. of monomer | Telogen Type | Telogen Conc., g./100 g. of monomer | Pzn. temp., °C. | Product mole wt. By end group analysis | Product mole wt. Vapor pressure, osmometer | Viscosity of product cs. at 25° C. |
|---|---|---|---|---|---|---|---|---|
| 50: | | | | | | | | |
| A | Glyme | .0625 | Ethylene glycol | 1.0 | 50 | 4,840 | 4,170 | |
| B | do | .0875 | Ethylene glycol | 1.5 | 50 | 3,190 | 2,940 | |
| C | do | .125 | Ethylene glycol | 3.0 | 50 | 1,685 | 1,580 | |
| 51: | | | | | | | | |
| A | Acetone | .033 | Pentanediol-1,5 | 1.3 | 60 | 5,350 | 5,920 | |
| B | do | .066 | Pentanediol-1,5 | 2.7 | 60 | 3,730 | 3,920 | 3,890 |
| C | do | .13 | Pentanediol-1,5 | 5.3 | 60 | 2,070 | 2,100 | 669 |
| 52A | Glyme | .13 | Resorcinol | 5.9 | 50 | 1,570 | | |
| 53A | do | .07 | Bisphenol A | 12.1 | 50 | 2,010 | | |
| 54A | Acetone | .5 | Polytetrahydrofuran [1] | 100.0 | 25 | 1,950 | | |
| 55A | Glyme | .07 | RJ-100 [2] | 33.0 | 50 | 3,120 | | [3] |

[1] Molecular weight of about 1000.
[2] Partially hydrolyzed styrene-vinyl acetate copolymer, hydroxyl functionality of 5.4, brittle solid at 25° C., and molecular weight of about 1500.
[3] Viscous liquid.

Example 6

Polypropylene ether glycol telomers of several different molecular weights were prepared by the method of this invention as generally shown with respect to the preceding examples from pentane diol-1,5 as the telogen and propylene oxide as the monomer. Triol telomers, likewise, were prepared according to the present method using CP–260 (tripropylene oxide adduct of glycerol, see above) as the telogen and propylene oxide as the monomer. These diols and triols of the present invention as used in this example were stripped to remove residual monomer but not treated to remove the catalyst nor end groups. Those polymers were then compared with polyurethane grade commercially available polypropylene either glycols and triols (prepared from KOH) as to their percent unsaturation. The monofunctionality of the diols was also compared. The results obtained are shown in Tables F and G, below:

The determination of monofunctionality was made considering that only —OH and olefinic end groups should exist and that the unsaturation would appear where otherwise an —OH group would be present. The sum of the equivalents/mole of hydroxyl and of olefinic unsaturation is thus taken to be 2 for diols. The data in Table F show that the hydroxyl functionality of the various diols at about the 1000 molecular weight level is about the same but that at the higher molecular weight levels the hydroxyl functionality of the diols prepared by the method of the present invention is much closer to the theoretical functionality. Table G, above, shows similar results with respect to the triols. Again, triols prepared by the telomerization process of the present invention have a much higher hydroxyl functionality (low unsaturation) than the commercial triols.

Example 7

Telomer polyether diols and triols were prepared by the methods similar to those of the preceding examples using the $Zn_3[Co(CN)_6]_2$ catalyst treated with glyme. The monomer was propylene oxide and the telogen was pentane diol-1,5 for making diols and CP–260 (see above) for making triols. These telomers were only stripped to remove monomer, see Example 6, above. The diol telomers were then reacted or chain extended with 2,4-tolylene diisocyanate at 120° C. for 40 hours using 0.035 part by weight of stannous octoate to speed the reaction to form linear polyurethanes. Similar extensions were made with the telomer triols. The maximum hardness was determined for the diols, and the minimum amount of swelling for the triols. Similar experiments were run on commercially available polyurethane grade polypropylene ether glycols and triols made using KOH and the results obtained are shown in Tables H and I, below:

TABLE H

| Molecular weight of polypropylene ether glycol: | Maximum hardness of resulting polyurethane [1] |
|---|---|
| 1920 [2] | [3] 182 |
| 1950 [4] | [3] 132 |
| 2900 [2] | [3] 104 |
| 2960 [4] | [3] 32 |
| 3500 [2] | [3] 75 |
| 3330 [4] | [3] 25 |

[1] Williams plasticity.
[2] Polypropylene ether glycol telomer made as described above.
[3] A series of extensions with TDI was done on each sample of polyether glycol. With excess polyether glycol or excess of TDI lower hardnesses were observed. Hence, the polyurethane represent about a 1:1 mol ratio of polyether glycol to TDI.
[4] Commercially available polypropylene ether glycol as described above.

TABLE I

| Molecular weight of polypropylene ether triol: | Index of minimum swelling of resulting polyurethane, 70 hours at 75° F. in toluene |
|---|---|
| 2900 [1] | 237 |
| 2850 [2] | 262 |
| 4060 [1] | 268 |
| 3780 [2] | 300 |

[1] Polypropylene ether triol telomer made as described above.
[2] Commercially available polypropylene ether triol as described above.

The above results show that with respect to the telomer diols produced by the present invention much higher molecular weight linear polyurethanes can be obtained. In the case of the telomer triols of this invention stronger polyurethanes were obtained. In this case the extent of swelling of the resulting polyurethanse was measured. This measurement gives an indication of the strength of the network obtained, i.e., the lower the value, the greater the strength which is related to the functionality of the triol at a given molecular weight. With greater network formation or greater strength the toluene has much more difficulty in penetrating and swelling the polymer.

Example 8

The reaction of phosgene with an organic compound having hydroxyl groups results in the formation of a chloroformate. The chloroformate group can react with an amino group to form a urethane linkage. Accordingly, a dichloroformate can react with a diamine to form a polyurethane. Liquid telomer diols were prepared according to the preceding examples from propylene oxide and pentane diol-1,5 as the telogen and reacted with phosgene to form dichloroformates of the telomer diols which were then chain extended with diamines to form polyurethanes. In one case the dichloroformate polyether was reacted with piperazine and in another case it was mixed with the dichloroformate of 1,4-butane diol and hexamethylene diamine to form polyurethanes. Similar tests were conducted on commercially available urethane grade polypropylene ether glycols using the same conditions. The results obtained are shown in Table J, below:

TABLE J

| Polypropylene ether glycol molecular weight | Diamine for chain extending chloroformate | Low M.W. polymer added | Polyurethane obtained | |
|---|---|---|---|---|
| | | | Intrinsic viscosity | |
| | | | Solvent | Value |
| 3,305 [1] | Piperazine | | $CH_2Cl_2$ | 0.85 |
| 3,470 [2] | do | | $CH_2Cl_2$ | 0.35 |
| 2,000 [1] | HMDA | [3] | m-Cresol | 2.35 |
| 2,000 [2] | HMDA | [3] | do | .99 |

[1] Polypropylene ether glycol telomer of present invention as described above.
[2] Commercially available material as described above.
[3] Dichloroformate of 1,4-butane diol.

The above results show that polyurethanes made with the telomers of the present invention give much higher viscosities and consequently higher molecular weights than polyurethanes made with commercially available polypropylene ether glycols.

Example 9

Polyurethane foams were prepared using liquid triol telomers of this invention as well as commercially available triols by the one-shot process in which the polyol was fed to a mixing head from a supply container, the tolylene diisocyanate was fed from another container to the head, and the activator mixture was fed from another container to the mixing head where all of the ingredients were mixed together rapidly and quickly discharged to a mold and the mixture allowed to foam. The activator mixture generally comprises the blowing agent, dispersing agent and catalysts although one or more of these materials may be in the polyol or polyisocyanate stream so long as they do not prereact with the polyol or polyisocyanate. The materials used in making the polyurethane foams and the results obtained are shown in Tables K and L below:

TABLE K.—FORMULATIONS FOR POLYURETHANE FOAMS

| Run number | 60 | 61 | 62 | 63 | 64 |
|---|---|---|---|---|---|
| Materials, parts by weight: | | | | | |
| Triol | [1] 100 | [2] 100 | [2] 100 | [4] 100 | [4] 100 |
| $CCl_3F$ | 3.0 | 3.0 | 3.0 | 3.0 | 3.0 |
| Silicone [5] | 1.5 | 1.5 | 1.5 | 1.5 | 1.5 |
| Stannous octoate | 0.27 | 0.27 | 0.27 | 0.20 | 0.10 |
| Lead naphthenate | 0.10 | 0.10 | 0.10 | 0.10 | 0.05 |
| 80/20 mix of 2, 4/2, 6-tolylene diisocyanates | 49.0 | 49.0 | 49.0 | 49.0 | 49.0 |
| Water | 4.0 | 4.0 | 4.0 | 4.0 | 4.0 |
| N-methyl morpholine | 0.60 | 0.60 | 0.60 | 0.60 | 0.60 |
| Tetramethyl butane diamine | 0.05 | 0.05 | 0.05 | 0.05 | 0.15 |

[1] Polypropylene ether triol having a molecular weight of about 3,000. Propylene oxide adduct of glycerine. Commercial material.
[2] Same as 1 but containing about 0.024% by weight of the $Zn_3[Co(CN)_6]_2$ catalyst treated with glyme as disclosed in preceding examples.
[3] Triol telomer of this invention prepared as in preceding examples from propylene oxide and CP–260 (see above) and having a molecular weight of about 3,000 and containing 6% of a diol telomer of this invention prepared as in the preceding examples from propylene oxide and pentane diol-1,5 having a molecular weight of about 2,000 to increase strength.
[4] Triol telomer of this invention prepared as in preceding examples from propylene oxide and CP–260 (see above) and having a molecular weight of about 3,000.
[5] Dow Silicone 201. A polysiloxane-polyoxyalkylene block type co polymer.

TABLE L.—PHYSICAL PROPERTIES OF POLYURETHANE FOAMS

| Run number | 60 | 61 | 62 | 63 | 64 |
|---|---|---|---|---|---|
| Density, p.c.f. | 1.31 | 1.28 | 1.32 | 1.33 | 1.44 |
| Tensile, p.s.i. | 13.8 | 12.7 | 14.8 | 12.6 | 11.3 |
| Tear, lbs./in. | 2.2 | 1.6 | 1.9 | 1.3 | 1.1 |
| Elongation | 190 | 110 | 160 | 140 | 110 |
| Schopper (cracked) | 46 | 42 | 45 | 44 | 42 |
| Link loads in lbs., 12″ x 12″ x 2″: | | | | | |
| 25% | 24.0 | 26.0 | 24.0 | 27.5 | 27.0 |
| 65% | 45.0 | 50.0 | 46.0 | 51.0 | 53.0 |
| 25% return | 18.0 | 19.5 | 17.0 | 20.0 | 20.0 |
| Percent recovery | 75.0 | 73 | 71 | 74 | 74 |
| Load factor | 1.87 | 1.92 | 1.92 | 1.89 | 1.96 |
| Compression set (80%) | 15.5 | 8.2 | 8.7 | 6.8 | 4.8 |
| Du Pont static fatigue test, loss in load at: | | | | | |
| 25% | 27.1 | 34.0 | 29.2 | 27.3 | 29.6 |
| 65% | 15.6 | 38.0 | 21.7 | 19.6 | 28.3 |
| ASTM bouncing betty, 65,500 cycles, loss in load at: | | | | | |
| 25% | 28.8 | 35.2 | 30.0 | 29.6 | 30.8 |
| 65% | 13.6 | 25.3 | 22.8 | 22.2 | 24.8 |

The above data show that the polyol telomers produced by the method of the present invention are useful in making polyurethane foams having properties comparable to those from foams made with commercially available polyols. Run 62 shows that the cyanide catalyst does not visibly affect the properties of the commercial polyols. The polyol telomers of Runs 61, 63 and 64 were stripped after preparation to remove residual monomer but were not otherwise treated.

Example 10

The method of telomerization or polymerization of this example was similar to the methods of telomerization shown in the previous examples. The catalyst used was $Zn_3[Co(CN)_6]_2$ prepared with glyme as shown above while the monomer was propylene oxide. In one instance nonamethylene dimercaptan was used as the telogen while in another thiophenol was the telogen. The conditions of telomerization and the results obtained are shown in Table M, below:

The resulting polymers were liquids. These results show that liquid polyethers also can be obtained using mercaptans as telogens.

Example 11

Several telomerizations were carried out in which the monomer was 1,2-epoxy butane in the presence of tetrahydrofuran as the solvent. The solvent, telogen and part of the monomer were added with the catalyst, a zinc cobalticyanideglyme complex having the general formula $Zn_3[Co(CN)_6]_2$ prepared with glyme as shown above pared by reacting an aqueous solution of zinc chloride with an aqueous solution of calcium cobalticyanide. After slowly mixing the two solutions, glyme was added, the mixture centrifuged and the clear solution discarded. The catalyst precipitate was then twice reslurried in glyme and centrifuged, or twice reslurried in a mixture of water and glyme and centrifuged followed by another reslurry in glyme and centrifugation, followed by vacuum drying at 50° C. The telomerization was conducted in a sealed reactor under nitrogen, and after the initial reaction, the balance of the monomer was added incrementally over a period of several hours. The times and temperatures employed, reaction conditions and results obtained are shown in Table N, below:

TABLE N

| Run number | Catalyst, wt. percent of monomer | THF, wt. percent of monomer | Telogen | Telogen, wt. percent of monomer | Temp., °C. | | Time, hours | | Millimoles of unsaturation per gram of telomer (polyol) obtained | Notes |
|---|---|---|---|---|---|---|---|---|---|---|
| 11: | | | | | | | | | | |
| A | .04 | 0 | Hexylene glycol | 4.3 | 50 | (80)# | 42 | (3)# | 0.14 | Oil. |
| B | .04 | 0 | do | 4.1 | 50 | | 30 | | 0.18 | Oil. |
| C | .06 | 0 | do | 4.1 | 50 | | 30 | | 0.17 | Oil. |
| D | .04 | 6 | do | 4.1 | 50 | (80) | 57 | (1) | .066 | Oil. |
| E | .04 | 20 | do | 4.1 | 50 | (80) | 57 | (2) | .039 | Oil. |
| F | .08 | 60 | do | 4.3 | 50 | | 42 | | 0.020 | OH# 31.3, liquid. |
| G | .16 | 60 | do | 4.3 | 50 | | 42 | | 0.022 | OH# 32.5, liquid. |
| H | .14 | 50 | do | 6.1 | 50 | | 24 | | 0.013 | OH# 47.0, liquid. |
| I | .04 | 60 | do | 4.1 | 80 | (50) | 6 | (6) | 0.014 | Oil. |
| J | .08 | 60 | do | 4.1 | 50 | | 48 | | 0.015 | Oil. |
| K | .08 | 60 | Pentanediol-1,5 | 3.6 | 50 | | 48 | | 0.016 | Oil. |
| L | .12 | 50 | Butanediol-1,4 | 3.0 | 80 | (50) | 4.5 | (24) | .032 | OH# 41.6. |

NOTE.—#=50° C. for 42 hours, then 80° C. for 3 hours. Similar conditions for Runs D, E, I and L.

Table N shows the results of telomerizations of 1,2-butene oxide with an without tetrahydrofuran (THF) as a solvent. It will be noted that in the absence of THF the products had unsaturation contents of from 0.14 to 0.18 millimole per gram. When made in the presence of 60 percent THF, the products had unsaturation contents of from 0.014 to 0.022 millimoles per gram. It will also be noted that at six and twenty percent THF concentration unsaturation content values fall intermediate between the extremes. Thus it seems rather clear that the unsaturation of poly-1,2-butylene ether glycols is reduced according to the amount of basic solvent in which it is made.

Example 12

The method of this example was similar to that of Example 11, supra, except that 1,2-epoxybutane was telomerized in the presence of various solvents. The

TABLE M

| Run number | Catalyst conc., wt. percent on wt. of monomer | Telogen conc., wt. percent on wt. of monomer | Reaction Time, hrs. | Temp., °C. | Polymer yield (percent conversion) | Hydroxy number |
|---|---|---|---|---|---|---|
| 70 | .13 | ¹ 5.0 | 96 Then 3.5 | 50 80 | 84 | 33.4 |
| 71 | .27 | ¹ 10.0 | 96 Then 3.5 | 50 80 | 98 | 55.0 |
| 72 | .067 | ² 2.9 | 23 | 50 | 60 | 23.6 |
| 73 | .13 | ² 5.9 | 23 | 50 | 85 | 32.9 |

¹ Nonamethylene dimercaptan.
² Thiophenol.

telomerization conditions and results obtained are shown below in Table O:

TABLE O

| Run Number | Catalyst, wt. percent of monomer | Solvent | Solvent, wt. percent of monomer | Telogen | Telogen, wt. percent of monomer | Temp., °C. | | Time, hours | | Telomer unsaturation, mm./g. |
|---|---|---|---|---|---|---|---|---|---|---|
| 12: | | | | | | | | | | |
| A | .04 | THF | 20 | Hexylene glycol | 4.1 | 50 | (80)# | 57 | (2)# | .039 |
| B | .16 | THF | 20 | 1,4 butanediol | 3.6 | 50 | (80) | 23 | (4) | .023 |
| C | .12 | THF | 20 | ...do... | 3.6 | 80 | | 30 | | .044 |
| D | .16 | Glyme | 2 | ...do... | 3.6 | 50 | (80) | 30 | (4) | .046 |
| E | .16 | ...do... | 8 | ...do... | 3.6 | 50 | (80) | 30 | (4) | .026 |
| F | .16 | Methyl THF | 20 | ...do... | 3.6 | 50 | (80) | 23 | (4) | .048 |
| G | .16 | Dioxane | 20 | ...do... | 3.6 | 50 | (80) | 23 | (4) | .071 |
| H | .12 | Benzene | 20 | ...do... | 3.6 | 80 | | 35 | | .080 |
| I | .08 | Hexane | 20 | ...do... | 3.6 | 80 | | 30 | | .167 |

NOTE.—#=See Table N, supra.

All above products were liquids.

Table O shows the effect of certain other solvents in comparison to the effect of THF. The effect of temperature on the unsaturation content of this polymer is also shown. Glyme, i.e., 1,2-dimethoxyethane, methyltetrahydrofuran, dioxane and benzene appear to have a definite effect of lowering the unsaturation whereas hexane has much less of an effect if any.

It is not precisely known what occurs during telomerization using acidic catalysts and basic solvents but it is believed that since increasing the temperature has the effect of increasing the unsaturation, one effect of the solvent would be to allow more efficient heat transfer from the catalyst particles, monomer and telomer, and thus would lower the temperature at which the reactions take place. However, if this were the total effect, it does not seem plausible to expect large differences between the effect of solvents with approximately the same molecular weights (and thus the same molecular mobility). Particularly compelling is the difference between the effects of 20 percent THF and hexane which gave products having unsaturation contents of 0.04 and 0.17 respectively.

Thus, it seems more likely that the effect is more chemical in nature and that it results from some reaction between some part of the catalyst and the solvent molecules. Particularly, it may be that these solvents react as bases in neutralizing an acid function of the catalyst. It would appear that this acid function is not directly responsible for polymerization activity since the polymerizaton activity is not seriously affected.

The reaction of epoxide compounds responsible for the formation of unsaturation in their telomers is believed to be their isomerization to unsaturated alcohols. Thus, a small proportion of 1,2-butene oxide isomerizes to crotyl alcohol which in turn can act as a telogen for a portion of the 1,2-butene oxide:

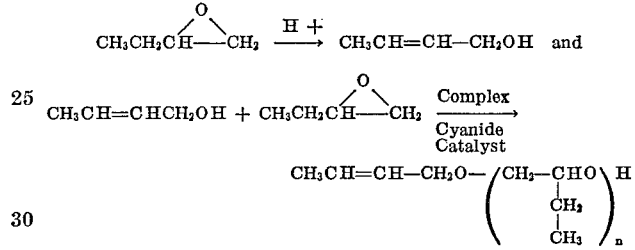

The monohydroxyl telomer so produced when mixed with the telomer from the intentionally added telogen thus can reduce the average functionality of the product obtained.

Example 13

The method of this example was similar to that of Examples 11 and 12, supra, except that propylene oxide was the monomer used. The telomerization conditions and results obtained are shown below in Table P:

TABLE P

| Run number | Catalyst, wt. percent of monomer | Solvent | Solvent, wt. percent of monomer | Telogen | Telogen, wt. percent of monomer | Temp., °C. | | Time, hours | | Telomer unsaturation, mm./g. | Notes |
|---|---|---|---|---|---|---|---|---|---|---|---|
| 3: | | | | | | | | | | | |
| A | .02 | None | 0 | Hexylene glycol | 4.3 | 50 | | 42 | | .005 | |
| B | .12 | ...do... | 0 | 1,4-butanediol | 1.8 | 50 | | 36 | | .007 | OH# 24.6 |
| C | .02 | THF | 6 | Hexylene glycol | 4.3 | 50 | | 42 | | .004 | |
| D | .04 | THF | 60 | ...do... | 4.3 | 50 | | 42 | | .003 | |
| E | .16 | THF | 60 | ...do... | 4.3 | 50 | | 42 | | .007 | |
| F | .07 | THF | 50 | ...do... | 5.8 | 50 | | 30 | | .001 | OH# 7318 |
| G | .12 | THF | 50 | 1,4-butanediol | 1.8 | 50 | | 32 | | .005 | OH# 24.1 |
| H | .066 | None | 0 | Trimethylolpropane | 4.6 | 80 | | 9 | | .0134 | OH# 56.3 |
| I | .055 | ...do... | 0 | ...do... | 4.6 | 80 | | 14 | | .0146 | OH# 57.9 |
| J | .04 | THF | 50 | Hexylene glycol | 2.9 | 80 | | 2.5 | | .006 | OH# 28.4 |
| K | .04 | THF | 50 | ...do... | 2.9 | 50 | (80)# | 5 | (1)# | .0025 | OH# 27.3 |
| L | .14 | THF | 60 | 1,4-butanediol | 4.5 | 50 | (80) | 62 | (2) | .0016 | OH# 66.6 |
| M | .04 | Glyme | 2 | ...do... | 3.6 | 50 | | 30 | | .0036 | |
| N | .04 | ...do... | 8 | ...do... | 3.6 | 50 | | 30 | | .0032 | |
| O | .04 | Dioxane | 60 | Hexylene glycol | 4.3 | 50 | (80) | 40 | (2.5) | .007 | |
| P | .04 | Benzene | 60 | ...do... | 4.3 | 50 | (80) | 40 | (2.5) | .005 | |
| Q | .04 | Hexane | 60 | ...do... | 4.3 | 50 | (80) | 40 | (2.5) | .004 | |

NOTE.—#=See Table N, supra.
All above products were liquids.

Table P shows the effect of solvents on the unsaturation of polypropylene ether polyols made with complex cyanide catalysts. Here the effect is not nearly as clear as with poly-1,2-butylene ether polyols. The unsaturation of the telomers is already quite low and further reduction is difficult to measure. Also other factors may account for the formation of some of the unsaturation found in some of the products. However the results at 80° C. are fairly convincing that a suppression of the unsaturation has been obtained in THF. Also it seems significant that there was one run in THF with an unsaturation content of 0.001 millimoles per gram although others, with and without THF, had unsaturation contents of from 0.003 to 0.007.

It is of interest to note that an epoxide, itself an ether, may in some cases perform this function during its own polymerization. Indeed this may be the reason telomers of propylene oxide have such low unsaturation values. On the other hand, as the molecular weight of the monomer increases within a homologous series, this effect may be lessened through polarity or dilution. This was found to be the case when comparing the unsaturation of poly-1,2-butylene ether glycols made in THF and methyl-THF.

What is claimed is:

1. The method of making polyethers having at least one terminal hydroxyl group and an average molecular weight of between about 300 and 150,000 which comprises:

(1) polymerizing in the liquid state at a temperature of from about 0 to 180° C. at least one polymerizable organic cyclic oxide monomer selected from the group consisting of ethylene oxide; 1,2-propylene oxide; 1,2-butene oxide; 1,2-dodecane monoxide; isobutylene monoxide; styrene oxide; 1,2-pentene oxide; isopentene oxide; 1,2-diisobutylene oxide; 1,2-hexene oxide; 1,2-heptene oxide; allyl glycidyl ether; isoheptene oxide; 1,2-octene oxide; 1,2-nonene oxide; 1,2-decene oxide; 1,2-hendecene oxide; methyl glycidyl ether; ethyl glycidyl ether; phenyl glycidyl ether; butadiene monoxide; isoprene monoxide; oxetane, tolyl glycidyl ether; 3,3-dimethyl oxetane; 3-n-nonyl oxetane; 3-allyl-3-methyl oxetane; 3-vinyl-3-methyl oxetane; 1,2-pentadecene oxide; 3,3-diethyl oxetane; 3-ethyl-3-butyl oxetane; 3-chloromethylene oxetene; 3-chloromethyl-3-methyl oxetane and 3-methyl-3-ethyl oxetane with (2) at least one telogen having a molecular weight up to 4000 selected from the group consisting of methyl alcohol; ethyl alcohol; propyl alcohol; octyl alcohol; cetyl alcohol; ceryl alcohol; isopropyl alcohol; 2-methyl-2-propanol; benzyl alcohol; cyclohexanol; glycol; diethylene glycol; triethylene glycol; pinacol; polypropylene ether glycol; polyethylene-propylene ether glycol; polytetramethylene ether glycol; propanediol-1,3; butanediols; pentanediol-1,5; trimethylol propane; tripropylene oxide adduct of glycerol; trimethylol propane monoallyl ether; pentaerythritol; polyether polyols made by reacting a minor molar amount of hexane triol or glycerine with propylene oxide or ethylene oxide; 1,2,6-hexane triol and the propylene oxide adduct of glycerine, in admixture with (3) a double metal cyanide complex catalyst in an amount of from 0.001 to 15% by weight of said monomer, said catalyst having the general formula: $M_a(K)_c \cdot (H_2O)_d \cdot (R)_e$ where K is selected from the group consisting of:

$M'(CN)_b$ and $M'[(CN)_r(X)_t]_b$ where M is at least one metal selected from the group consisting of Zn(II), Fe(II), Fe(III), Co(II), Ni(II), Mo(IV), Mo(VI), Al(III), V(IV), V(V), Sr(II), W(IV), W(VI), Mn(II) and Cr(III), where M' is at least one metal selected from the group consisting of Fe(II), Fe(III), Co(II), Co(III), Cr(II), Cr(III), Mn(II), Mn(III), V(IV), and V(V), where X is at least one material selected from the group consisting of $F^-$, $Cl^-$, $Br^-$, $I^-$, $OH^-$, $NO^=$, $CO$, $H_2O$, $NO_2^-$, $C_2O_4^=$, $SO_4^=$, $CNO^-$, $CNS^-$, $NCO^-$, and $NCS^-$, where R is an organic material containing 1 to 18 carbon atoms substantially water miscible selected from the group consisting of alcohols, aldehydes, ketones, esters, ethers, amides, nitriles and sulfides, where $a$, $b$ and $c$ are numbers whose values are functions of the valences and coordination numbers of M and M' with the total net positive charge on M times $a$ being essentially equal to the total negative charge on (K) times $c$, where $r$ and $t$ are numbers, $r$ being greater than $t$, where $d$ is zero, or a number, and where $e$ is zero or a number sufficient to increase the activity of $M_a(K)_c \cdot H_2O$ for the polymerization of said monomer.

the ratio of the mols of said monomer to the number of hydroxyl groups of said telogen being between about 3500:1 to 1:100.

2. The method of claim 1 wherein said temperature is between 15 and 80° C.

3. The method of claim 1 wherein said polymerization is conducted in the presence of a solvent for said monomer selected from the group consisting of tetrahydrofuran; 1,2-dimethoxyethane; methyl tetrahydrofuran; dioxane; benzene and hexane.

4. The method of claim 1 wherein said catalyst is a zinc hexacyanocabaltate complex with a polyalkylene glycol.

5. The method of claim 1 wherein said telogen is propylene glycol.

6. The method of claim 1 wherein said cyclic oxide is ethylene oxide or propylene oxide.

References Cited

UNITED STATES PATENTS

| | | | |
|---|---|---|---|
| 2,141,443 | 12/1938 | Stanley et al. | 260—615 B |
| 2,448,664 | 9/1948 | Fife et al. | 260—615 B |
| 2,723,284 | 11/1955 | De Groote | 260—615 B |
| 2,807,651 | 9/1957 | Britton et al. | 260—615 B X |
| 2,942,033 | 6/1960 | Leis et al. | 260—615 B X |
| 2,965,658 | 12/1960 | Kirkpatrick | 260—615 B X |
| 2,996,550 | 8/1961 | Simons | 260—615 B |
| 3,117,998 | 1/1964 | Cosby et al. | 260—615 B |
| 3,278,458 | 10/1966 | Belner | 260—2 |
| 3,336,242 | 8/1967 | Hampson et al. | 260—615 B X |
| 3,404,109 | 10/1968 | Milgron | 260—615 B X |

FOREIGN PATENTS

| | | | |
|---|---|---|---|
| 6611403 | 2/1967 | Netherlands | 260—615 B |

HOWARD T. MARS, Primary Examiner

U.S. Cl. X.R.

252—51, 52 A, 426, 428, 430, 431; 260—26 P, 27.5 NC, 77.5 AP, 209 R, 429 X, 484 R, 484 B, 484 P, 495 R, J, N, 607 A, 609 F, 613 B, 615 B

UNITED STATES PATENT OFFICE
CERTIFICATE OF CORRECTION

PO-1050 (5/69)

Patent No. 3,829,505     Dated August 13, 1974

Inventor(s) Robert Johnston Herold

It is certified that error appears in the above-identified patent and that said Letters Patent are hereby corrected as shown below:

Column 9, line 29, which reads: "$M_a[M'(CN)_r(X)_t]_b]_c.$" should read ---$M_a[M'[(CN)_r(X)_t]_b]_c.$---.

Column 9, line 41, which reads: "$(M'-CN...M...NC-M'-)_n$" should read ---$(-M'-CN...M...NC-M'-)_n$---.

Column 10, line 30, which reads: "$Zn_3]Fe(CN)_5NO_2]_2$" should read ---$Zn_3[Fe(CN)_5NO_2]_2$---.

Column 10, line 42, which reads: "necessary" should read ---necessarily---.

Column 12, line 11, which reads: "chin" should read ---chain---.

Column 13, line 28, which reads: "accomplshed my" should read ---accomplished by---.

Column 14, line 65, which reads: "$CC_4H_8O-$" should read ---$OC_4H_8O-$ ---.

Column 16, line 50, which reads: "wih" should read ---with---.

Table B, under heading which reads: "Temperature, "C." should read ---Temperature, °C.---.

Table C, under Mole percent [5] (Run number 33 C) which reads: "3.2" should read ---1.2---.

UNITED STATES PATENT OFFICE
CERTIFICATE OF CORRECTION

Patent No. 3,829,505      Dated August 13, 1974

Inventor(s) Robert Johnston Herold

It is certified that error appears in the above-identified patent and that said Letters Patent are hereby corrected as shown below:

Column 21, line 72, which reads: "either" should read ---ether---.

Column 23, line 61, which reads: "polyurethanse" should read ---polyurethanes---.

Table M, heading which reads: "Telogen conc., et. percent on wt. of monomer" should read ---Telogen conc., wt. percent on wt. of monomer---.

Table M, heading which reads: "Hydroxy number" should read ---Hydroxyl number---.

Column 26, line 47, which reads: "an" should read ---and---.

Table P, under heading Run number, which reads: "3:" should read ---13---.

Table P, under heading Notes (Run F), which reads "OH#7318" should read ---OH#73.8---.

Column 29, line 39, insert ---hexylene glycol--- before "pinacol".

Column 29, line 43, delete "tripropylene oxide adduct of glycerol".

Column 29, line 47, change the ";" to ---and---.

Column 29, lines 47-48, delete "and the propylene oxide adduct of glycerine".

PO-1050
(5/69)

UNITED STATES PATENT OFFICE
CERTIFICATE OF CORRECTION

Patent No. 3,829,505   Dated August 13, 1974

Inventor(s) Robert Johnston Herold

It is certified that error appears in the above-identified patent and that said Letters Patent are hereby corrected as shown below:

Column 30, line 4, which reads: "NO=" should read ---NO---.

Column 30, line 5, before "CO" add ---O=---.

Column 30, lines 22-24, delete "the ratio of the mols of said monomer to the number of hydroxyl groups of said telogen being between about 3500:1 to 1:100.".

Column 30, line 26, which reads: "between 15 to 80°C." should read ---from about 15 to 80°C.---.

Column 30, cancel claims Nos. 4 and 5.

Signed and sealed this 29th day of October 1974.

(SEAL)
Attest:

McCOY M. GIBSON JR.
Attesting Officer

C. MARSHALL DANN
Commissioner of Patents